United States Patent
Aktas et al.

(10) Patent No.: US 12,185,279 B2
(45) Date of Patent: Dec. 31, 2024

(54) RECEIVER ASSISTED SIDELINK RESOURCE ALLOCATION USING AN ADAPTIVE THRESHOLD

(71) Applicant: QUALCOMM Incorporated, San Diego, CA (US)

(72) Inventors: Tugcan Aktas, La Jolla, CA (US); Yeliz Tokgoz, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 356 days.

(21) Appl. No.: 17/491,048

(22) Filed: Sep. 30, 2021

(65) Prior Publication Data

US 2022/0132469 A1     Apr. 28, 2022

Related U.S. Application Data

(60) Provisional application No. 63/105,203, filed on Oct. 23, 2020.

(51) Int. Cl.
    *H04W 72/02*     (2009.01)
    *H04L 1/00*     (2006.01)
          (Continued)

(52) U.S. Cl.
    CPC ............ *H04W 72/02* (2013.01); *H04L 1/0003* (2013.01); *H04W 28/26* (2013.01); *H04W 72/20* (2023.01); *H04W 72/541* (2023.01)

(58) Field of Classification Search
    CPC ..... H04W 72/02; H04W 28/26; H04W 72/20; H04W 72/541; H04W 72/56
    See application file for complete search history.

(56) References Cited

U.S. PATENT DOCUMENTS

2016/0295624 A1    10/2016    Novlan et al.
2017/0332207 A1    11/2017    Sheng et al.
(Continued)

FOREIGN PATENT DOCUMENTS

WO     2017026973 A1     2/2017
WO     2018027528 A1     2/2018
(Continued)

OTHER PUBLICATIONS

ETSI TS 138 214: "5G, NR, Physical Layer Procedures for Data (3GPP TS 38.214 Version 16.15.0 Release 16)", V16.15.0, Feb. 2024, pp. 1-178.

(Continued)

*Primary Examiner* — Hassan A Phillips
*Assistant Examiner* — Prenell P Jones
(74) *Attorney, Agent, or Firm* — Shumaker & Sieffert, P.A.

(57) ABSTRACT

Aspects of the disclosure relate to transmitting, from a first user equipment (UE) to a second UE, a resource report indicative of an availability of a set of resources among a sidelink resource pool based on a measurement of interference in the set of resources. The resource report includes resource availability information indicating that a reserved set of resources reserved for a third UE is available based on an interference parameter associated at least in part with the second UE or the third UE. Other aspects, and features are also claimed and described.

24 Claims, 12 Drawing Sheets

(51) Int. Cl.
*H04W 28/26* (2009.01)
*H04W 72/20* (2023.01)
*H04W 72/541* (2023.01)

(56) References Cited

U.S. PATENT DOCUMENTS

| | | |
|---|---|---|
| 2018/0234980 A1 | 8/2018 | Li et al. |
| 2019/0364590 A1* | 11/2019 | Sartori ................. H04W 72/23 |
| 2020/0037343 A1 | 1/2020 | He et al. |
| 2020/0045719 A1 | 2/2020 | Wang et al. |
| 2020/0267523 A1* | 8/2020 | Tang ..................... H04L 5/0064 |
| 2020/0314804 A1* | 10/2020 | Shin ....................... H04W 24/10 |
| 2021/0127364 A1 | 4/2021 | Panteleev et al. |
| 2021/0160821 A1 | 5/2021 | Lin et al. |
| 2021/0352628 A1* | 11/2021 | Lee ........................ H04W 72/56 |
| 2022/0086803 A1* | 3/2022 | Li ........................ H04W 72/0446 |
| 2022/0132486 A1 | 4/2022 | Aktas et al. |
| 2022/0322229 A1* | 10/2022 | Ye ......................... H04W 76/14 |
| 2022/0322359 A1* | 10/2022 | Ye ......................... H04W 72/02 |
| 2023/0141004 A1* | 5/2023 | Hong .................... H04W 72/02 370/311 |
| 2023/0164825 A1* | 5/2023 | Deng .................... H04W 72/02 370/329 |
| 2023/0292355 A1* | 9/2023 | Peng ................... H04W 72/542 370/329 |

FOREIGN PATENT DOCUMENTS

| | | |
|---|---|---|
| WO | 2020024208 A1 | 2/2020 |
| WO | 2020059045 A1 | 3/2020 |
| WO | 2020092939 A1 | 5/2020 |
| WO | 2020173536 A1 | 9/2020 |

OTHER PUBLICATIONS

ETSI TS 138 214: "5G, NR, Physical Layer Procedures for Data (3GPP TS 38.214 version 17.8.0 Release 17)", ETSI TS 138 214 V17.8.0, Feb. 2024, 237 Pages.

* cited by examiner

RECEIVER ASSISTED SIDELINK RESOURCE ALLOCATION USING AN ADAPTIVE THRESHOLD

PRIORITY CLAIM

This application claims priority to and the benefit of provisional patent application No. 63/105,203 filed in the United States Patent and Trademark Office on Oct. 23, 2020. The entire content of the prior application is incorporated herein by reference as if fully set forth below in its entirety and for all applicable purposes.

INTRODUCTION

The present disclosure relates generally to wireless communications and more specifically to sidelink communications.

As the demand for mobile broadband access continues to increase, user equipments (UEs) may be able to communicate with other UEs without relaying their data via a base station or network. Research and development for facilitating and enhancing device-to-device (D2D) communication continue to advance wireless communication technologies not only to meet the growing demand for mobile broadband communication between UEs, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a method of wireless communication at a user equipment is disclosed. In a more particular example, the method includes: transmitting, from a first user equipment (UE) to a second UE, a resource report indicative of an availability of a set of resources among a sidelink resource pool, the resource report being based on a measurement of interference in the set of resources, the resource report comprising resource availability information indicating that a reserved set of resources reserved for a third UE is available, the resource availability information being based on an interference parameter associated with the second UE or the third UE.

In another example, a first UE is disclosed. In a more particular example, the first UE includes: memory; and a processor communicatively coupled to the memory, the processor configured to: transmit, from a first UE to a second UE, a resource report indicative of an availability of a set of resources among a sidelink resource pool, the resource report being based on a measurement of interference in the set of resources, the resource report comprising resource availability information indicating that a reserved set of resources reserved for a third UE is available, the resource availability information being based on an interference parameter associated with the second UE or the third UE.

In yet another example, a first user equipment (UE) is disclosed. In a more particular example, the first UE includes: means for means for generating a resource report, for a second UE, indicative of an availability of a set of resources among a sidelink resource pool, the resource report being based on a measurement of interference in the set of resources, the resource report comprising resource availability information indicating that a reserved set of resources reserved for a third UE is available, the resource availability information being based on an interference parameter associated with the second UE or the third UE; and means for transmit, from the first UE to a second UE, the resource report.

In yet another example, a non-transitory processor-readable storage medium storing processor-executable programming is disclosed. In a more particular example, the non-transitory processor-readable storage medium stores processor-executable programming for causing a processing circuit to: transmit, from a first UE to a second UE, a resource report indicative of an availability of a set of resources among a sidelink resource pool, the resource report being based on a measurement of interference in the set of resources, the resource report comprising resource availability information indicating that a reserved set of resources reserved for a third UE is available, the resource availability information being based on an interference parameter associated with the second UE or the third UE.

In one example, a method of wireless communication at a user equipment is disclosed. In a more particular example, the method includes: receiving, at a first user equipment (UE), a request from a second UE for a report indicative of resources available in an upcoming resource selection window; receiving, during a sensing window, a plurality of SCI messages from one or more devices located proximate to the first UE, wherein each of the plurality of SCI messages indicates which future resources the device that transmitted that SCI is reserving; determining, for at least a first device associated with a first SCI message of the plurality of SCI messages, that a signal-to-interference ratio (SIR) of a first reference signal received power (RSRP) associated with a signal transmitted by the second UE and a second RSRP associated with signal transmitted by the first device is above an SIR threshold; determining that resources reserved by the first SCI message are available based on the SIR being above the SIR threshold; generating a report indicative of which resources in the upcoming resource selection window are available for transmission by the second UE based on SIRs associated with devices that transmitted the plurality of SCI messages received during the sensing window; and transmitting the report to the first UE.

In another example, a wireless communication device is disclosed. In a more particular example, wireless communication device includes: a transceiver; memory; and a processor communicatively coupled to the transceiver and the memory, the processor configured to: receive, at a wireless communication device via the transceiver, a request from a second UE for a report indicative of resources available in an upcoming resource selection window; receive, during a sensing window via the transceiver, a plurality of SCI messages from one or more devices located proximate to the wireless communication device, wherein each of the plurality of SCI messages indicates which future resources the device that transmitted that SCI is reserving; determine, for at least a first device associated with a first SCI message of the plurality of SCI messages, that a signal-to-interference ratio (SIR) of a first reference signal received power (RSRP) associated with a signal transmitted by the second UE and a second RSRP associated with signal transmitted by the first device is above an SIR threshold; determine that resources reserved by the first SCI message are available based on the SIR being above the SIR threshold; generate a report indicative of which resources in the upcoming resource selection window are available for transmission by the second UE based on SIRs associated with devices that transmitted the plurality of SCI messages received during the sensing window; and transmit, via the transceiver, the report to the second UE.

In yet another example, a non-transitory processor-readable storage medium storing processor-executable programming is disclosed. In a more particular example, the non-transitory processor-readable storage medium stores processor-executable programming for causing a processing circuit to: receive, at a first UE, a request from a second UE for a report indicative of resources available in an upcoming resource selection window; receive, during a sensing window, a plurality of SCI messages from one or more devices located proximate to the wireless communication device, wherein each of the plurality of SCI messages indicates which future resources the device that transmitted that SCI is reserving; determine, for at least a first device associated with a first SCI message of the plurality of SCI messages, that a signal-to-interference ratio (SIR) of a first reference signal received power (RSRP) associated with a signal transmitted by the second UE and a second RSRP associated with signal transmitted by the first device is above an SIR threshold; determine that resources reserved by the first SCI message are available based on the SIR being above the SIR threshold; generate a report indicative of which resources in the upcoming resource selection window are available for transmission by the second UE based on SIRs associated with devices that transmitted the plurality of SCI messages received during the sensing window; and transmit the report to the second UE.

These and other aspects of the invention will become more fully understood upon a review of the detailed description, which follows. Other aspects and features will become apparent to those of ordinary skill in the art, upon reviewing the following description of specific, exemplary features in conjunction with the accompanying figures. While the following description may discuss various advantages and features relative to certain features and figures, all features can include one or more of the advantageous features discussed herein. In other words, while this description may discuss one or more features as having certain advantageous features, one or more of such features may also be used in accordance with the various features discussed herein. In similar fashion, while this description may discuss exemplary features as device, system, or method features it should be understood that such exemplary features can be implemented in various devices, systems, and methods.

DETAILED DESCRIPTION

Figure 1:
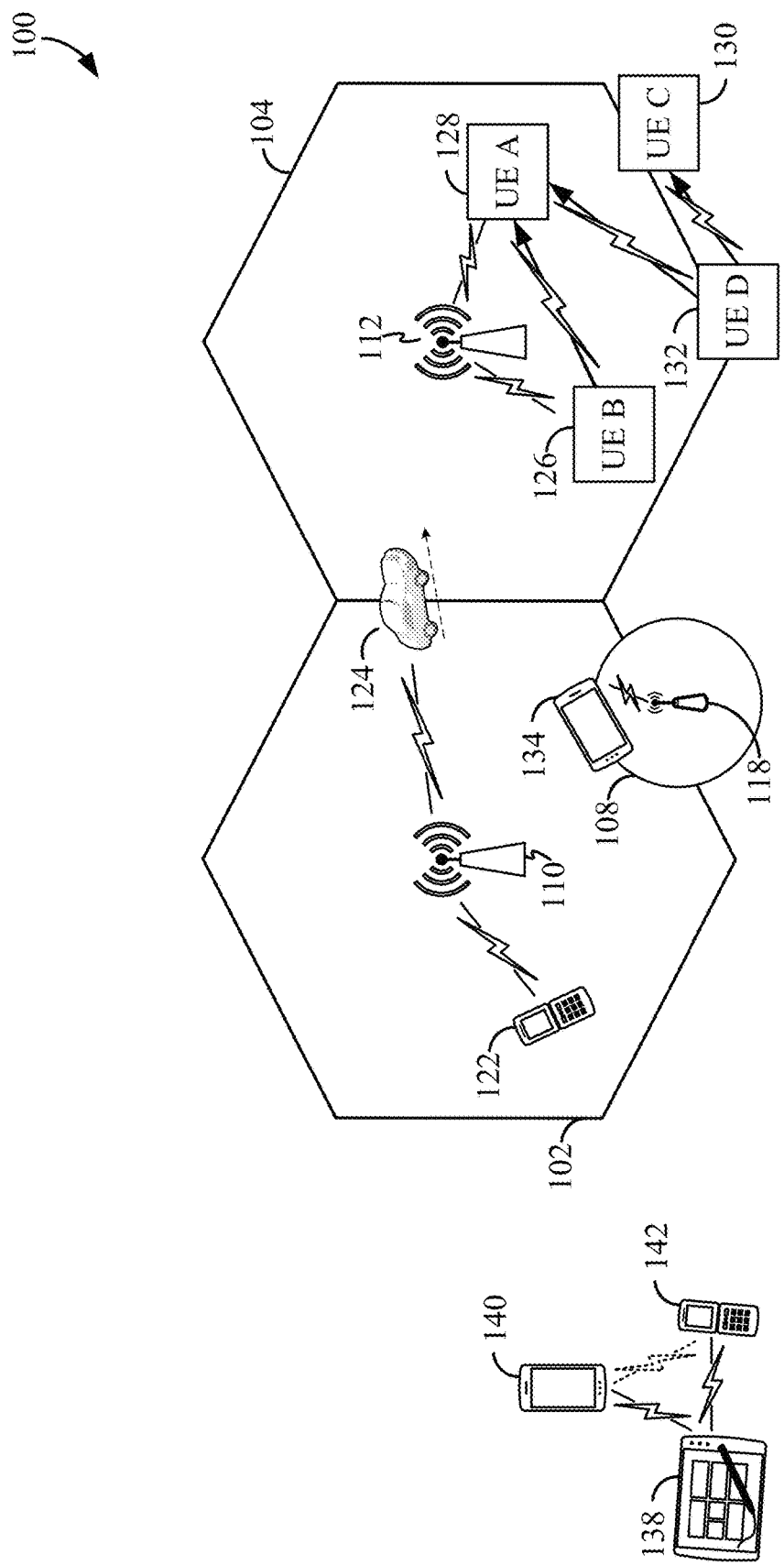
FIG. 1 is a conceptual illustration of an example of a radio access network of a wireless communication system in accordance with some aspects of the disclosed subject matter.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes aspects and features by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, features and/or uses may come about via integrated chip features and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described features. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

As used herein, sidelink communications or sidelink signals refer generally to any of various forms of device-to-device (D2D) communication in a wireless communication network. In various aspects, this disclosure provides mechanisms that can facilitate autonomous selection of resources for sidelink communications. For example, when a mobile device has information for transmission over a sidelink connection, this transmitting device can monitor or sense a sidelink channel or carrier to identify available sidelink resources to use. However, in some examples (e.g., to reduce power consumption by forgoing this resource sensing), the transmitting device can request a report from another nearby device that monitors the sidelink carrier or channel (e.g., a smartphone, a tablet, a vehicle, etc.). Here, the monitoring device can generate a report indicating which resources in the selection window are reserved, and which are available. The monitoring device can then send the report to the transmitting device.

The disclosure that follows presents various concepts that may be implemented across a broad variety of telecommunication systems, network architectures, and communication standards. FIG. 1 is a conceptual illustration of an example of a radio access network 100 of a wireless communication system in accordance with some aspects of the disclosed subject matter, and is described as an illustrative example without limitation. In some aspects, RAN 100 can implement any suitable wireless communication technology or combination of technologies to provide radio access to one or more user equipment (UE), such as UEs 122, 124, 126, 128, 134, 138, 140, and/or 142. For example, RAN 100 can operate according to 3$^{rd}$ Generation Partnership Project (3GPP) New Radio (NR) specifications, which is sometimes referred to as 5G NR or simply 5G. As another example, RAN 100 can operate under a hybrid of 5G NR and Evolved Universal Terrestrial Radio Access Network (eUTRAN) standards, which is sometimes referred to as LTE. The 3GPP refers to this hybrid RAN as a next-generation RAN, or NG-RAN. Of course, many other examples can be utilized in connection with the subject matter disclosed herein without departing from the scope of the present disclosure.

As illustrated in the example of FIG. 1, RAN 100 can includes various base stations, such as base stations 110, 112, and/or 118. Broadly, a base station can be used to implement a network element in a radio access network responsible for radio transmission and reception in one or more cells to or from a UE (e.g., UEs 122, 124, 126, 128, 134, 138, 140, and/or 142). In different technologies, standards, and/or contexts, various terminology has been used to refer to a network elements that act as a base station. For example, a base station can also be referred to by those skilled in the art using various terminology to refer to a network element that connects one or more UE apparatuses to one or more portions of a core network (e.g., core network 202 described below in connection with FIG. 2), such as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

In some aspects, the geographic area covered by RAN 100 can be divided into cellular regions (cells) that can be uniquely identified by a user equipment (UE) based on an identification broadcasted from one access point or base station. FIG. 1 illustrates macrocells 102 and 104, and a small cell 108, each of which can include one or more sectors (not shown). For example, a sector can be defined as a sub-area of a cell, and all sectors within one cell can be served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 1, two base stations 110 and 112 are illustrated in cells 102 and 104. Although not shown, a base station can control a remote radio head (RRH) in a cell, such that the base station and antenna are not geographically collocated. That is, a base station can have an integrated antenna or can be connected to an antenna or RRH by feeder cables. In the illustrated example, cells 102 and 104 can be referred to as macrocells, as base stations 110 and 112 support cells having a relatively large size. Further, a base station 118 is shown in small cell 108 (which can be referred to, for example, as a microcell, picocell, femtocell, home base station, home Node B, home eNode B, etc.) which can overlap with one or more macrocells. In the example illustrated in FIG. 1, cell 108 can be referred to as a small cell, as base station 118 supports a cell having a relatively small size. In some aspects, cell sizing can be done according to system design as well as component constraints.

It is to be understood that RAN 100 can include any number of wireless base stations and cells. Further, a relay node can be deployed to extend the size or coverage area of a given cell. Additionally, base stations 110, 112, and/or 118 can provide wireless access points to a core network for any number of mobile apparatuses. In some examples, base stations 110, 112, and/or 118 can be particular implementations of a base station described below in connection with, and illustrated in, FIG. 2.

Within RAN 100, the cells can include UEs that may be in communication with one or more sectors of each cell. Further, each base station 110, 112, and/or 118 can be configured to provide an access point to a core network (e.g., as described below in connection with FIG. 2) for all the UEs in the respective cells. For example, UEs 122 and 124 can be in communication with base station 110; UEs 126, 128, 130, and 132 can be in communication with base station 112; and UE 134 can be in communication with base station 118. In some examples, UEs 122, 124, 126, 128, 134, 138, 140, and/or 142 can be particular implementations of a UE described below in connection with, and illustrated in, FIG. 2.

In some aspects, sidelink signals can be used between UEs without necessarily relying on scheduling or control information from a base station. For example, two or more UEs (e.g., UEs 126, 128, 130, and 132) can communicate with each other using peer to peer (P2P) or sidelink signals without relaying that communication through a base station (e.g., base station 112). In another example, UE 138 is illustrated communicating with UEs 140 and 142. In such an example, UE 138 can function as a scheduling entity or a primary sidelink device, and UEs 140 and 142 can function as scheduled entities or a non-primary (e.g., secondary) sidelink device. In yet another example, a UE can function as a scheduling entity in a device-to-device (D2D), peer-to-peer (P2P), vehicle-to-vehicle (V2V) network, and/or in a mesh network. In a mesh network example, UEs 140 and 142 can optionally communicate directly with one another in addition to communicating with a scheduling entity (e.g., UE 138). Thus, in a wireless communication system with scheduled access to time-frequency resources and having a cellular configuration, a P2P configuration, and/or a mesh configuration, a scheduling entity (e.g., UE 138) and one or more scheduled entities (e.g., UEs 140 and 142) may communicate utilizing the scheduled resources.

In various examples, some or all UEs may communicate via sidelink signals without necessarily relying on scheduling or control information from a base station. For example, two or more UEs (e.g., UEs 126, 128, 130, and 132) can communicate with each other using peer to peer (P2P) or sidelink signals without relaying that communication through a base station (e.g., base station 112). In another example, UE 138 is illustrated communicating with UEs 140 and 142. In such an example, UE 138 can function as a scheduling entity or a primary sidelink device, and UEs 140 and 142 can function as scheduled entities or a non-primary (e.g., secondary) sidelink device. In yet another example, a UE can function as a scheduling entity in a device-to-device (D2D), peer-to-peer (P2P), vehicle-to-vehicle (V2V) network, and/or in a mesh network. In a mesh network example, UEs 140 and 142 can optionally communicate directly with one another in addition to communicating with a scheduling entity (e.g., UE 138). Thus, in a wireless communication system with scheduled access to time-frequency resources and having a cellular configuration, a P2P configuration, and/or a mesh configuration, a scheduling entity (e.g., UE 138) and one or more scheduled entities (e.g., UEs 140 and 142) may communicate utilizing the scheduled resources.

In some examples, UE 126 can request a second resource report from UE 128 (e.g., a receiving or RX UE), and can receive the second resource report from UE 128. In such an example, UE 128 can monitor sidelink resources and generate a resource report indicative of which resources are available for use by UE 126 to transmit a packet to UE 128 based on the power in the signals received during the monitoring. For example, UE 128 can monitor a sensing window for messages (e.g., sidelink control information (SCI)) from other UEs (e.g., UE 132) that reserve resources in a selection window. A sensing window can include a sliding window (e.g., in time) of sidelink resources (e.g., one or more sub-carriers, one or more resource elements, etc.) covering a preconfigured time and a preconfigured range of frequency resources that have been monitored, and a resource selection window can include a sliding window of upcoming sidelink resources covering a preconfigured time and a preconfigured range of frequency resources. Note that the sensing window and resource selection window can be different sizes (e.g., in time and/or frequency).

In some examples, UE 128 can transmit the second report to UE 126, for use by UE 126 in determining which resources in the selection window are available for UE 126.

In some examples, UE 126 can use the report to identify which resources are available (e.g., are unlikely to cause too much interference with a signal transmitted to UE 128). In some examples, UE 126 can select resources that can be used to transmit a packet to UE 128 with an acceptable level of Interference.

Figure 2:
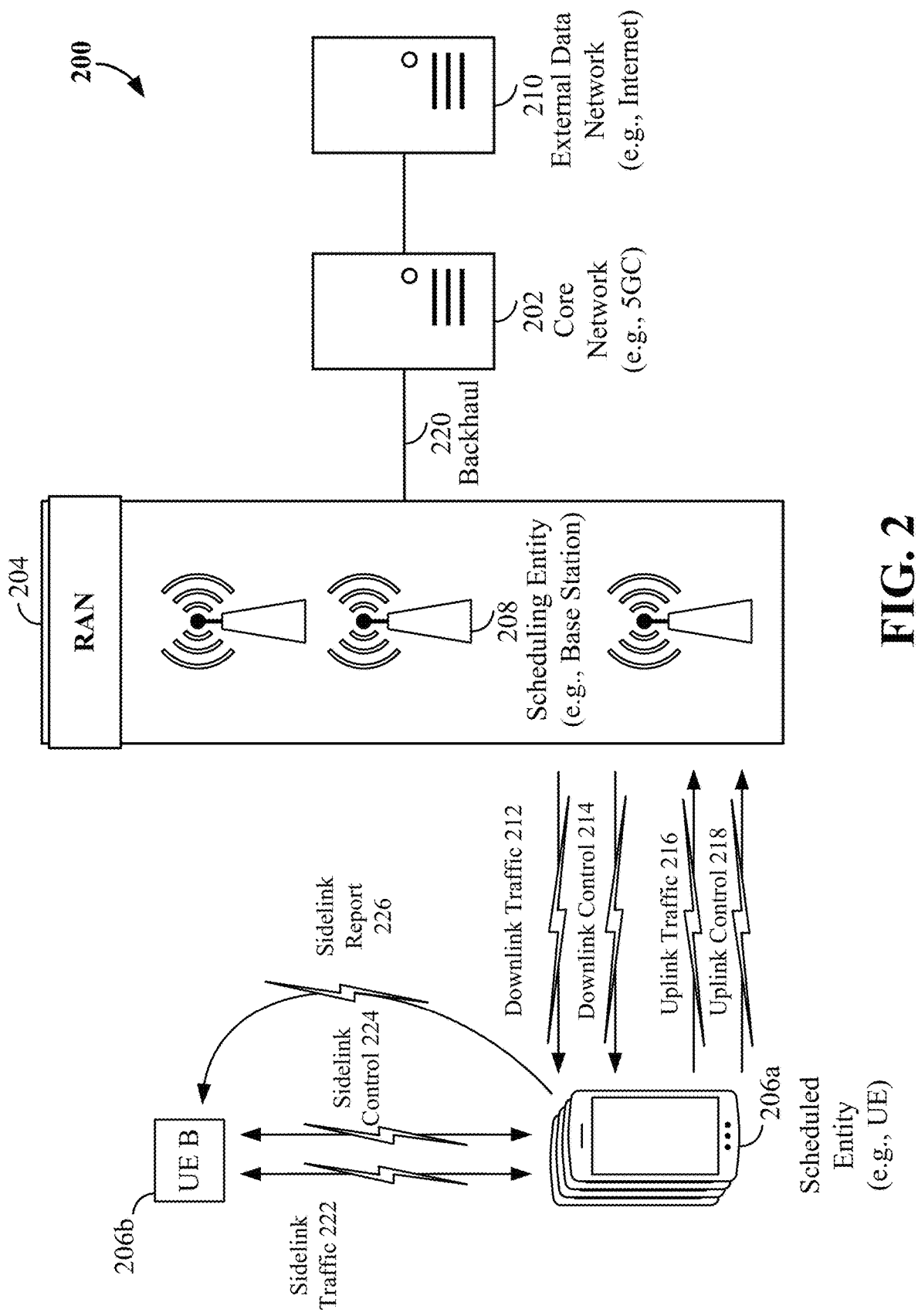
FIG. 2 is a schematic illustration of a wireless communication system in accordance with some aspects of the disclosed subject matter.

FIG. 2 is a schematic illustration of a wireless communication system 200 in accordance with some aspects of the disclosed subject matter, and is described as an illustrative example without limitation. In some aspects, wireless communication system 200 can include three interacting domains: a core network 202, a radio access network (RAN) 204, and various user equipment (UE), such as user equipment 206a and user equipment 206b. In some aspects, by virtue of wireless communication system 200, UE 206 can be enabled to carry out data communication with an external data network 210, such as (but not limited to) the Internet.

In some aspects, RAN 204 can implement any suitable wireless communication technology or combination of technologies to provide radio access to UE 206. For example, RAN 104 can operate according to $3^{rd}$ Generation Partnership Project (3GPP) New Radio (NR) specifications, which is sometimes referred to as 5G NR or simply 5G. As another example, RAN 104 can operate under a hybrid of 5G NR and Evolved Universal Terrestrial Radio Access Network (eU-TRAN) standards, which is sometimes referred to as LTE. The 3GPP refers to this hybrid RAN as a next-generation RAN, or NG-RAN. Of course, many other examples can be utilized in connection with the subject matter disclosed herein without departing from the scope of the present disclosure.

As illustrated in the example of FIG. 2, RAN 204 includes various base stations 208. Broadly, a base station can be used to implement a network element in a radio access network responsible for radio transmission and reception in one or more cells to or from a UE, such as UE 206a and/or UE 206b. In different technologies, standards, and/or contexts, various terminology has been used to refer to a network elements that act as a base station. For example, a base station can also be referred to by those skilled in the art using various terminology to refer to a network element that connects one or more UE apparatuses to one or more portions of core network 202, such as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

In some aspects, as illustrated in FIG. 2, RAN 204 can support wireless communication for multiple mobile apparatuses. A mobile apparatus can be referred to as user equipment (UE) in 3GPP standards, but can also be referred to by those skilled in the art using various terminology to refer to a network element that provides a user with access to one or more network services, such as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In general, a UE can be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs can include a number of hardware structural components sized, shaped, and arranged to facilitate communication; such components can include antennas, antenna arrays, RF chains, amplifiers, one or more processors, etc., electrically coupled to each other. For example, some non-limiting examples of a mobile apparatus include a mobile, a cellular (cell) phone, a smartphone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus can additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health and/or fitness tracker, a digital audio player (e.g., MP3 player), a camera, a game console, etc. A mobile apparatus can additionally be a digital home device or smart home device such as a home audio device, a home video device, and/or a home multimedia device, an appliance, a vending machine, intelligent lighting, a home security system, a smart meter, etc. A mobile apparatus can additionally be a smart energy device, a security device, a solar panel and/or solar array, a municipal infrastructure device controlling electric power (e.g., a smart grid), a municipal infrastructure device controlling lighting, a municipal infrastructure device controlling water, etc.; an industrial automation and enterprise device; a logistics controller; agricultural equipment; military defense equipment, vehicles, aircraft, ships, weaponry, etc. Still further, a mobile apparatus can provide for connected medicine or telemedicine support, e.g., health care at a distance. Telehealth devices can include telehealth monitoring devices and telehealth administration devices, whose communication may be given preferential treatment or prioritized access over other types of information (e.g., in terms of prioritized access for transport of critical service data, and/or relevant QoS for transport of critical service data).

In some aspects, wireless communication between RAN 204 and a UE (e.g., UE 206a, UE 206b) can be described as utilizing an air interface. Transmissions over the air interface from a base station (e.g., base station 208) to one or more UEs (e.g., UE 206a, UE 206b) can be referred to as downlink (DL) transmission. In accordance with some aspects, the term downlink can refer to a point-to-multipoint transmission originating at a scheduling entity (e.g., base station 208). Another way to describe this scheme can be to use the term broadcast channel multiplexing. Transmissions from a UE (e.g., UE 206a, UE 206b) to a base station (e.g., base station 208) can be referred to as uplink (UL) transmissions. In some aspects, the term uplink can refer to a point-to-point transmission originating at a scheduled entity (e.g., UE 206a, UE 206b).

In some examples, access to the air interface can be scheduled, wherein a scheduling entity (e.g., base station 208) allocates resources for communication among some or all devices and equipment within its service area or cell.

In some aspects, base stations 208 are not the only entities that may function as scheduling entities. For example, a UE can function as a scheduling entity, scheduling resources for one or more scheduled entities (e.g., one or more other UEs).

As illustrated in FIG. 2, a base station (e.g., base station 208) can broadcast downlink traffic 212 to one or more scheduled entities (e.g., UE 206a, UE 206b). Broadly, a scheduling entity (e.g., base station 208) can be a node or device responsible for scheduling traffic in a wireless communication network, including the downlink traffic 212 and, in some examples, uplink traffic 216 from one or more scheduled entities (e.g., UE 206a, UE 206b) to the scheduling entity (e.g., base station 208). Additionally, a scheduled entity (e.g., UE 206a, UE 206b) can be a node or device that receives downlink control information 214, including but not limited to scheduling information (e.g., a grant), synchronization or timing information, or other control information from another entity in the wireless communication network such as the scheduling entity (e.g., base station 208). Note that UE 206b may or may not interface with a scheduling entity (e.g., base station 208).

In general, base stations 208 can include a backhaul interface for communication with a backhaul portion 220 of the wireless communication system. The backhaul 220 can provide a link between a base station 208 and the core network 202. Further, in some examples, a backhaul network can provide interconnection between the respective base stations 208. Various types of backhaul interfaces may be employed, such as a direct physical connection, a virtual network, or the like using any suitable transport network.

In some aspects, core network 202 can be a part of the wireless communication system 200, and can be independent of the radio access technology used in the RAN 204. For example, core network 202 can be configured according to 5G standards (e.g., 5GC). In other examples, core network 202 can be configured according to a 4G evolved packet core (EPC), or any other suitable standard or configuration.

In some examples, scheduled entities such as a first UE 206a and a second UE 206b can utilize sidelink signals for direct device to device (D2D) communication. Sidelink signals can include sidelink traffic 222, sidelink control 224, and/or sidelink reports 226. In some aspects, sidelink control information 222 can include a sidelink control information (SCI) message (e.g., in SCI format 1), which can include any suitable information that can be used by one or more other UEs to, for example, schedule transmissions (e.g., in SL resource selection mode 2). For example, SCI can include a priority of a transmission being scheduled, which can reflect a latency requirement of a communication. In a more particular example, SCI can include a priority level field that can be used to designate a priority level of a transmission (e.g., a packet(s) to be transmitted using a reserved resource), such as a 3-bit field with a lower value representing a higher priority. As another example, SCI can include information identifying resources that are reserved by the device (e.g., UE 206a, UE 206b) that transmitted the SCI.

In some aspects, sidelink control information 222 can include a request signal, such as request-to-send (RTS), a source transmit signal (STS), and/or a direction selection signal (DSS). Such a request signal can provide for a UE (e.g., UE 206a, UE 206b) to request a duration of time to keep a sidelink channel available for a sidelink signal. In some aspects, sidelink control information 222 can include a response signal, such as a clear-to-send (CTS) and/or a destination receive signal (DRS). The response signal may provide for the UE (e.g., UE 206a, UE 206b) to indicate the availability of the sidelink channel, e.g., for a requested duration of time. An exchange of request and response signals (e.g., handshake) can facilitate different UEs performing sidelink communications to negotiate the availability of the sidelink channel prior to communication of the sidelink traffic information 224.

In some aspects, sidelink report information 226 can include information (e.g., a report) that can be used by a first UE (e.g., an RX UE, UE 206a) to indicate which resources are detected as available and/or unavailable by the first UE. In some aspects, such a report can be transmitted to a second UE (e.g., a TX UE, UE 206b), using sidelink report link 226. In some aspects, report information 226 can be transmitted using reserved resources (e.g., reserved using sidelink control information (SCI), as described below in connection with FIG. 5). Additionally or alternatively, report information 226 can be transmitted using resources that are preconfigured to transmit report information 226 (e.g., resources defined in a standard as designated for transmission of report information 226).

Figure 3:
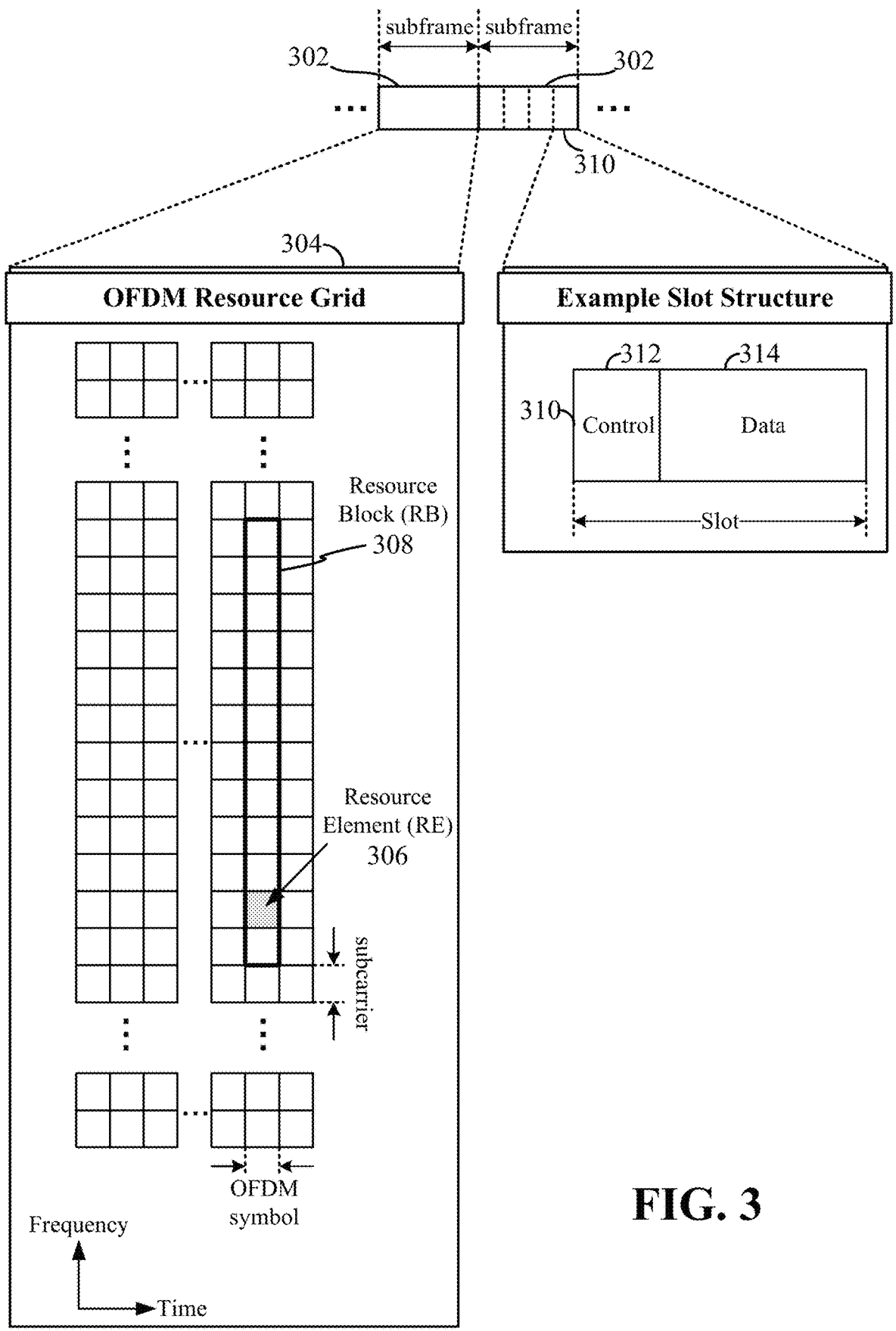
FIG. 3 is a schematic illustration of an organization of wireless resources in an air interface utilizing orthogonal frequency divisional multiplexing (OFDM) according to some aspects.

FIG. 3 is a schematic illustration of an organization of wireless resources in an air interface utilizing orthogonal frequency divisional multiplexing (OFDM) in accordance with some aspects of the disclosed subject matter, and is described as an illustrative example without limitation.

It should be understood by those of ordinary skill in the art that the various aspects of the present disclosure can be applied to a DFT-s-OFDMA waveform in substantially the same way as described herein below. That is, while some examples of the disclosed subject matter may focus on an OFDM link for clarity, it should be understood that the same principles can be applied as well to DFT-s-OFDMA waveforms. DFT-s-OFDM is a single carrier (SC)-like transmission scheme that can be used in conjunction with OFDM. In DFT-s-OFDM a data symbol can be encoded across multiple adjacent OFDM frequency resource elements (e.g., using multiple adjacent OFDM carriers), and the data symbols can be transmitted sequentially in the time domain. In OFDM, a data symbol can be encoded on a single frequency resource element (e.g., using a single OFDM carrier), and multiple data symbols can be transmitted in parallel on adjacent carriers. Signal processing in the transmit chains of OFDM and DFT-s-OFDM have many similarities, with DFT-s-OFDM utilizing an additional discrete Fourier transform (DFT) block to spread data symbols which can then be input to an inverse discrete Fourier transform (IDFT) block to transform the signal into the time domain. All else being equal, DFT-s-OFDM generally has lower peak-to-average power (PAPR) than OFDM. Accordingly, using DFT-s-OFDM for UL can reduce the amount of power used to transmit a given amount of data.

In some aspects, a frame can refer to a duration of 10 milliseconds (ms) for wireless transmissions, with each frame including 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application can vary from the example described here, depending on any number of factors. Here, time is in the horizontal direction with units of OFDM symbols; and frequency is in the vertical direction with units of subcarriers or tones.

Resource grid 304 can be used to schematically represent time-frequency resources for a given antenna port (e.g., in a MIMO implementation with multiple antenna ports available, a corresponding multiple number of resource grids 304 can be available for communication). Resource grid 304 can be divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE can represent one or more bits of information. In some examples, a block of REs can be referred to as a physical resource block (PRB) or more simply a resource block (RB) 308, which contains any suitable number of consecutive subcarriers in the frequency domain. In one example, an RB can include 12 subcarriers, a number independent of the numerology used. In some examples, depending on the numerology, an RB can include any suitable number of consecutive OFDM symbols in the time domain. Within the present disclosure, unless otherwise stated, it is assumed that a single RB such as RB 308 entirely corresponds to a single direction of communication (either transmission or reception for a given device).

A UE generally utilizes only a subset of resource grid 304. An RB can be the smallest unit of resources that can be allocated to a UE. Thus, as more RBs are scheduled for a particular UE, the modulation scheme chosen for the air interface increases, and data rates that can be achieved by the UE also increase. In FIG. 3, RB 308 is shown as occupying less than the entire bandwidth of subframe 302, with some subcarriers illustrated above and below RB 308. In a given implementation, subframe 302 can have a bandwidth corresponding to any number of one or more RBs 308. Further, in FIG. 3, RB 308 is shown as occupying less than the entire duration of subframe 302, although this is merely one possible example.

Each subframe 302 (e.g., a 1 ms subframe) can include one or multiple adjacent slots. In the example of FIG. 3, one subframe 302 includes four slots 310, as an illustrative example. In some examples, a slot can be defined according to a specified number of OFDM symbols with a given cyclic prefix (CP) length. For example, a slot can include 7 or 14 OFDM symbols with a nominal CP. Additional examples can include mini-slots having a shorter duration (e.g., 1, 2, 4, or 7 OFDM symbols). Such mini-slots can in some cases be transmitted occupying resources scheduled for ongoing slot transmissions for the same or for different UEs.

An expanded view of one of the slots 310 illustrates a slot including a control region 312 and a data region 314. In general, control region 312 can carry control channels (e.g., PDCCH, PSCCH), and data region 414 can carry data channels (e.g., PDSCH, PUSCH, PSSCH). Additionally or alternatively, a slot can contain various combinations of DL, UL, and/or SL, such as all DL, all UL, all SL, at least one DL portion and at least one SL portion, or at least one UL portion and at least one SL portion. The simple structure illustrated in FIG. 3 is merely exemplary in nature, and different slot structures can be utilized, and can include one or more of each of the control region(s) and data region(s).

Although not illustrated in FIG. 3, various REs 306 within an RB 308 can be scheduled to carry one or more physical channels, including control channels, shared channels, data channels, etc. Other REs 306 within RB 308 can also carry pilot signals and/or reference signals. These pilot signals and/or reference signals can facilitate performance of channel estimation of the corresponding channel by a receiving device, which can enable coherent demodulation/detection of the control and/or data channels within RB 308.

In a DL transmission, a transmitting device (e.g., base station 208) can allocate one or more REs 306 (e.g., within a control region 312) to carry DL control information (e.g., downlink control information 214 described above in connection with FIG. 2) including one or more DL control channels that generally carry information originating from higher layers, such as a physical broadcast channel (PBCH), a physical downlink control channel (PDCCH), etc., to one or more scheduled entities (e.g., a particular UE 206). In addition, DL REs can be allocated to carry DL physical signals that generally do not carry information originating from higher layers. These DL physical signals can include a primary synchronization signal (PSS); a secondary synchronization signal (SSS); demodulation reference signals (DM-RS); phase-tracking reference signals (PT-RS); channel-state information reference signals (CSI-RS); etc.

The synchronization signals PSS and SSS (collectively referred to as SS), and in some examples, the PBCH, can be transmitted in an SS block that includes 4 consecutive OFDM symbols (e.g., numbered via a time index in increasing order from 0 to 3). In the frequency domain, the SS block can extend over 240 contiguous subcarriers, with the subcarriers being numbered via a frequency index in increasing order from 0 to 239. Of course, the disclosed subject matter is not limited to this specific SS block configuration. Other non-limiting examples can utilize greater or fewer than two synchronization signals; can include one or more supplemental channels in addition to the PBCH; can omit a PBCH; and/or can utilize nonconsecutive symbols for an SS block, without departing from the scope of the present disclosure.

The PDCCH can carry downlink control information (DCI) for one or more UEs in a cell. This can include, but is not limited to, power control commands, scheduling information, a grant, and/or an assignment of REs for DL and UL transmissions.

In a UL transmission, a transmitting device (e.g., UE 206a, UE 206b) can utilize one or more REs 306 to carry UL control information (UCI) (e.g., uplink control information 218 described above in connection with FIG. 2). The UCI can originate from higher layers via one or more UL control channels, such as a physical uplink control channel (PUCCH), a physical random access channel (PRACH), etc., to the scheduling entity (e.g., base station 208). Further, UL REs may carry UL physical signals that generally do not carry information originating from higher layers, such as demodulation reference signals (DMRS), phase-tracking reference signals (PT-RS), sounding reference signals (SRS), etc. In some examples, the control information (e.g., uplink control information 218) can include a scheduling request (SR), i.e., a request for the scheduling entity (e.g., base station) 208 to schedule uplink transmissions (and in some examples, sidelink transmissions, such as in sidelink resource allocation mode 1). Here, in response to the SR transmitted on a control channel (e.g., over which uplink control information 218 is transmitted), the scheduling entity (e.g., base station 208) can transmit downlink control information (e.g., downlink control information 214) that can schedule resources for uplink packet transmissions.

UL control information can also include hybrid automatic repeat request (HARQ) feedback such as an acknowledgment (ACK) or negative acknowledgment (NACK), channel state information (CSI), and/or any other suitable UL control information. HARQ is a technique well-known to those of ordinary skill in the art, in which the integrity of packet transmissions can be checked at the receiving side for accuracy, e.g., utilizing any suitable integrity checking mechanism, such as a checksum or a cyclic redundancy check (CRC). If the integrity of the transmission confirmed, an ACK can be transmitted, whereas if not confirmed, a NACK can be transmitted. In response to a NACK, the transmitting device can send a HARQ retransmission, which can implement chase combining, incremental redundancy, etc.

In addition to control information, one or more REs 306 (e.g., within the data region 314) can be allocated for user data or traffic data. Such traffic can be carried on one or more traffic channels, such as, for a DL transmission, a physical downlink shared channel (PDSCH); or for an UL transmission, a physical uplink shared channel (PUSCH).

In order for a UE to gain initial access to a cell, the RAN (e.g., RAN 100, RAN 204) can provide system information (SI) characterizing the cell. This system information can be provided utilizing minimum system information (MSI), and other system information (OSI). The MSI can be periodically broadcast over the cell to provide the most basic information required for initial cell access, and for acquiring any OSI that may be broadcast periodically or sent on-demand. In some examples, the MSI can be provided over two different downlink channels. For example, the PBCH can carry a master information block (MIB), and the PDSCH can carry a system information block type 1 (SIB1), which is sometimes referred to as the remaining minimum system information (RMSI). In a more particular example, the MIB can include parameters for monitoring a control resource set, which can provide the UE with scheduling information corresponding to the PDSCH, e.g., a resource location of SIB1. OSI can include any SI that is not broadcast in the MSI. In some examples, the PDSCH can carry multiple SIBs, not limited to SIB1, described above. Here, the OSI can be provided in these SIBs, e.g., SIB2 and/or above.

In an SL transmission, a transmitting device (e.g., UE 206a, UE 206b) can utilize one or more REs 306 to carry SL control information (SCI) (e.g., sidelink control information 224 described above in connection with FIG. 2). SL REs may carry SL physical signals that generally do not carry information originating from higher layers, such as demodulation reference signals (DMRS), phase-tracking reference signals (PT-RS), sounding reference signals (SRS), etc.

SL control information can also include hybrid automatic repeat request (HARQ) feedback such as an acknowledgment (ACK) or negative acknowledgment (NACK), channel state information (CSI), and/or any other suitable SL control information. In addition to control information, one or more REs 306 (e.g., within the data region 314) can be allocated (e.g., in sidelink resource allocation mode 1) and/or reserved (e.g., in sidelink resource allocation mode 2) for user data and/or traffic data. Such traffic can be carried on one or more traffic channels, such as, for a SL transmission, a physical sidelink shared channel (PSSCH).

The channels or carriers described above and illustrated in FIGS. 2 and 3 are not necessarily all the channels or carriers that can be utilized between a scheduling entity (e.g., base station 208) and scheduled entities (e.g., UE 206a, UE 206b), and those of ordinary skill in the art will recognize that other channels or carriers can be utilized in addition to those illustrated, such as other traffic, control, and feedback channels. These physical channels described above are generally multiplexed and mapped to transport channels for handling at the medium access control (MAC) layer. Transport channels carry blocks of information called transport blocks (TB). The transport block size (TBS), which can correspond to a number of bits of information, can be a controlled parameter, based on the modulation and coding scheme (MCS) and the resources in a given transmission.

Figure 4:
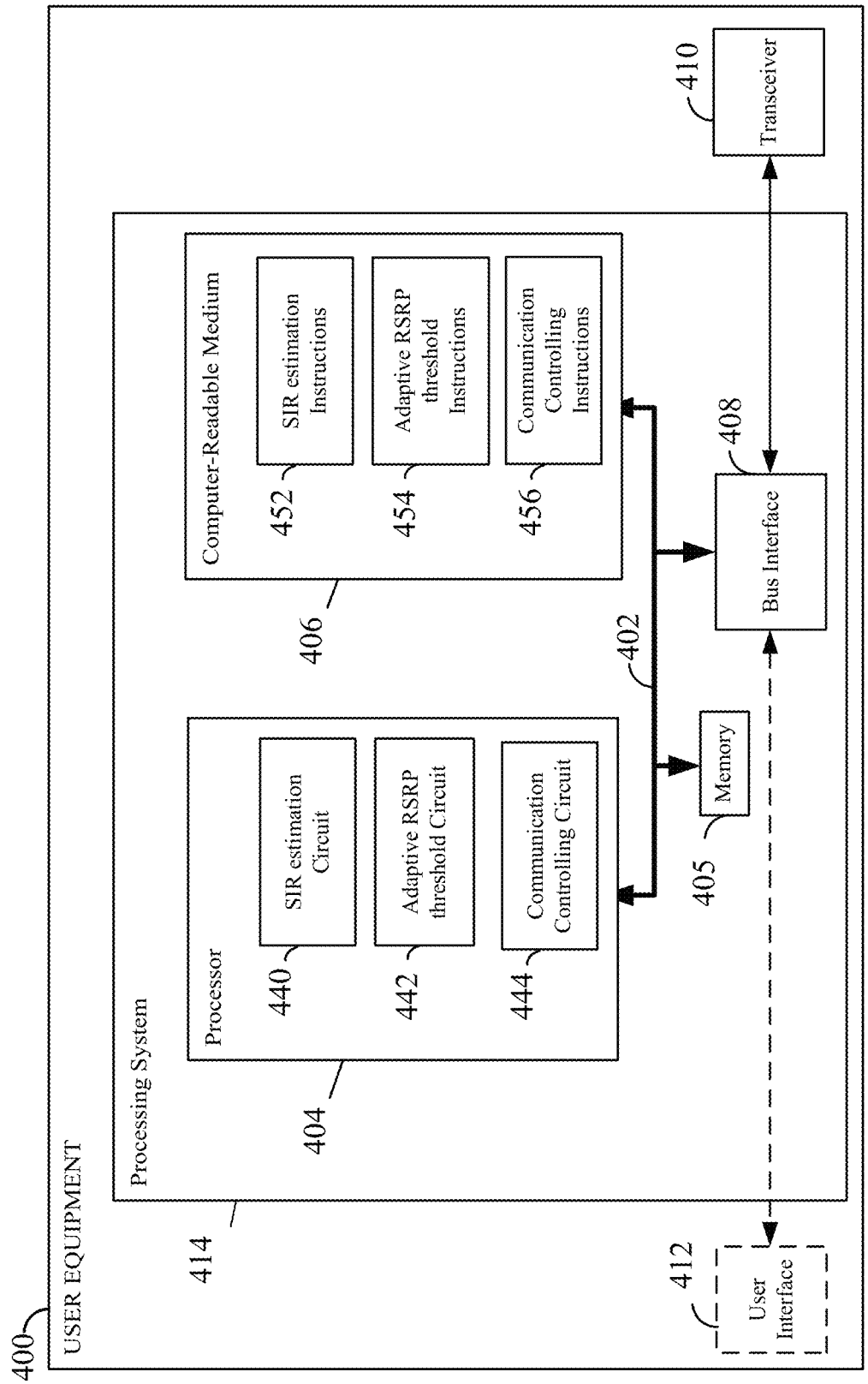
FIG. 4 is a block diagram conceptually illustrating an example of a hardware implementation for a scheduled entity in accordance with some aspects of the disclosed subject matter.

FIG. 4 is a block diagram conceptually illustrating an example of a hardware implementation for a user equipment (UE) 400 in accordance with some aspects of the disclosed subject matter, and is described as an illustrative example without limitation.

In some aspects, scheduling entity 400 can be implemented with a processing system 414 that includes one or more processors 404. Examples of processors 404 include central processing units (CPUs), microprocessors, microcontrollers, digital signal processors (DSPs), field programmable gate arrays (FPGAs), programmable logic devices (PLDs), graphics processing units (GPUs), state machines, gated logic, discrete hardware circuits, and other suitable hardware configured to perform the various functionality described throughout this disclosure. In various examples, UE 400 can be configured to perform any one or more of the functions described herein. That is, processor 404, as utilized in UE 400, can be used to implement any one or more of the processes and procedures described below in connection with FIGS. 5-7, 10-13A, and 15.

In this example, processing system 414 can be implemented with a bus architecture, represented generally by the bus 402. Bus 402 can include any number of interconnecting buses and bridges depending on the specific application of processing system 414 and the overall design constraints. Bus 402 can communicatively couple together various circuits including one or more processors (represented generally by processor 404), memory 405, and computer-readable media (represented generally by computer-readable medium 406). Bus 402 can also link various other circuits such as timing sources, peripherals, voltage regulators, and power management circuits, which are well known in the art, and therefore, will not be described any further. A bus interface 408 can provide an interface between bus 402 and a transceiver 410. Transceiver 410 can provide a communication interface or means for communicating with various other apparatus over a transmission medium. In some aspects, transceiver 410 can be configured using an array of antennas (e.g., antenna array 418) to facilitate directional transmission and/or reception. Depending upon the nature of the apparatus, a user interface 412 (e.g., keypad, display, touchscreen, speaker, microphone, joystick, etc.) can also be provided. Of course, such a user interface 412 can be omitted in some examples, such as a sensor (e.g., an IoT-based sensor).

In some aspects of the disclosed subject matter, processor 404 can include signal-to-interference (SIR) estimation circuitry 440 configured for various functions, including, for example, estimating a reference signal received power (RSRP) from multiple UEs, and estimating an SIR between a link from a TX UE to UE 400, and a link from a potentially interfering UE to UE 400, setting an SIR threshold, determining the SIR threshold based on the priority associated with the one or more packets, and/or determining the SIR threshold based on the MCS associated with the one or more packets. For example, SIR estimation circuitry 440 can be configured to implement one or more of the functions described below in connection with FIGS. 5, 6, 8, 9, and/or 12 such as functions described in connection with 520, 628, 630, 806, 902-906, 910, and/or 1208. Additionally, in some aspects, processor 404 can include adaptive reference signal received power (RSRP) circuitry 442 configured for various functions, including, for example, determining an adaptive RSRP threshold, and identifying resources as available based on a comparison of an RSRP of a signal received from a potentially interfering TX UE if the RSRP is below the adaptive RSRP threshold. For example, adaptive RSRP circuitry 442 can be configured to implement one or more of the functions described below in connection with FIGS. 5, 6, 8, 9, and/or 12, such as functions described in connection with 520, 630, 806, 902, 912, 914, and/or 1210. Additionally, in some aspects, processor 404 can include communication controlling circuitry 444 configured for various functions, including, for example, transmitting, to a second UE, a resource report indicative of an availability of a set of resources in a sidelink resource pool; receiving a request from the second UE for the resource report; receiving or identifying one or more collisions of transmissions from the second UE; receiving a control message from the third UE, the control message comprising resource reservation information identifying the reserved set of resources reserved for the third UE; receiving a reference signal from the second UE; receiving, from the second UE, priority information indicative of a priority associated with one or more packets to be transmitted by the second UE; receiving, from the second UE, data rate information indicative of a modulation and coding scheme (MCS) associated with one or more packets to be transmitted by the second UE; and/or receiving a plurality of control messages from a plurality of UEs including the third UE. For example, communication controlling circuitry 444 can be configured to implement one or more of the functions described below in connection with FIGS. 5, 6, 8, 9, 10, 11 and/or 12, such as functions described in connection with 518, 520, 532, 614, 630, 802, 810, 916, 1002, 1004, 1012, 1102, 1104, 1202, and/or 1212.

Processor 404 can manage bus 402 and can perform general processing, including the execution of software stored on computer-readable medium 406, which, when executed by processor 404, causes processing system 414 to perform the various functions described below (e.g., in connection with FIGS. 5, 6, 8, 9, 11, and/or 12) for any particular apparatus. In some aspects, computer-readable medium 406 and memory 405 can also be used for storing data that is manipulated by processor 404 when executing software.

One or more processors 404 in the processing system can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software can reside on a computer-readable medium 406. The computer-readable medium 7406 can be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that can be accessed and read by a computer. The computer-readable medium 406 can reside in the processing system 414, external to the processing system 414, or distributed across multiple entities including the processing system 414. The computer-readable medium 406 can be embodied in a computer program product. By way of example, a computer program product can include a computer-readable medium in packaging materials. Those skilled in the art will recognize how best to implement the described functionality presented throughout this disclosure depending on the particular application and the overall design constraints imposed on the overall system.

In one or more examples, computer-readable storage medium 406 can include SIR) estimation software 452 configured for various functions, including, for example, estimating a reference signal received power (RSRP) from multiple UEs, and estimating an SIR between a link from a TX UE to UE 400, and a link from a potentially interfering UE to UE 400, setting an SIR threshold, determining the SIR threshold based on the priority associated with the one or more packets, and/or determining the SIR threshold based on the MCS associated with the one or more packets. For example, SIR estimation software 452 can be configured to implement one or more of the functions described below in connection with FIGS. 5, 6, 8, 9, and/or 12, such as functions described in connection with 520, 628, 630, 806, 902-906, 910, 1202, 1208, and/or 1210. Additionally, in some aspects, computer-readable storage medium 406 can include adaptive RSRP software 454 configured for various functions, including, for example, determining an adaptive RSRP threshold, and identifying resources as available based on a comparison of an RSRP of a signal received from a potentially interfering TX UE if the RSRP is below the adaptive RSRP threshold. For example, adaptive RSRP software 454 can be configured to implement one or more of the functions described below in connection with FIGS. 5, 6, 8, 9, and/or 12, such as functions described in connection with 520, 630, 806, 902, 912, 914, 1202, 1208, and/or 1210. Additionally, in some aspects, computer-readable storage medium 406 can include communication controlling instructions 456 configured for various functions, including, for example, transmitting, to a second UE, a resource report indicative of an availability of a set of resources in a sidelink resource pool; receiving a request from the second UE for the resource report; receiving or identifying one or more collisions of transmissions from the second UE; receiving a control message from the third UE, the control message comprising resource reservation information identifying the reserved set of resources reserved for the third UE; receiving a reference signal from the second UE; receiving, from the second UE, priority information indicative of a priority associated with one or more packets to be transmitted by the second UE; receiving, from the second UE, data rate information indicative of a modulation and coding scheme (MCS) associated with one or more packets to be transmitted by the second UE; and/or receiving a plurality of control messages from a plurality of UEs including the third UE. For example, communication controlling instructions 456 can be configured to implement one or more of the functions described below in connection with FIGS. 5, 6, 8, 9, 10, 11 and/or 12, such as functions described in connection with 518, 520, 532, 614, 630, 802, 810, 916, 1002, 1004, 1012, 1102, 1104, 1202, and/or 1212.

In some aspects, UE 400 can include means for combining sidelink resource availability information from multiple sources (e.g., UE 400 and another nearby UE) to identify resources in a selection window that are available, determining an adaptive reference power received power (RSRP) threshold based on an SIR threshold and an RSRP of a signal from a transmitting UE (e.g., UE 400, or another nearby UE), and/or determining that a resource is not available based on a cross-link interference estimation, and/or means for electing a resource selection technique (e.g., a particular resource selection technique that includes various actions) that is appropriate based on one or more parameters indicative of transmission reliability. In some aspects, the aforementioned means can be the processor(s) 404 shown in FIG. 4 configured to perform the functions recited by the aforementioned means. In another aspect, the aforementioned means can be a circuit or any apparatus configured to perform the functions recited by the aforementioned means.

Of course, in the above examples, the circuitry included in the processor 404 is merely provided as an example, and other means for carrying out the described functions can be included within various aspects of the present disclosure, including but not limited to the instructions stored in the computer-readable storage medium 406, or any other suitable apparatus or means described in any one of FIGS. 1 and/or 2 and utilizing, for example, the processes and/or algorithms described below in connection with FIGS. 5, 6, 8, 9, 11, and/or 12.

Figure 5:
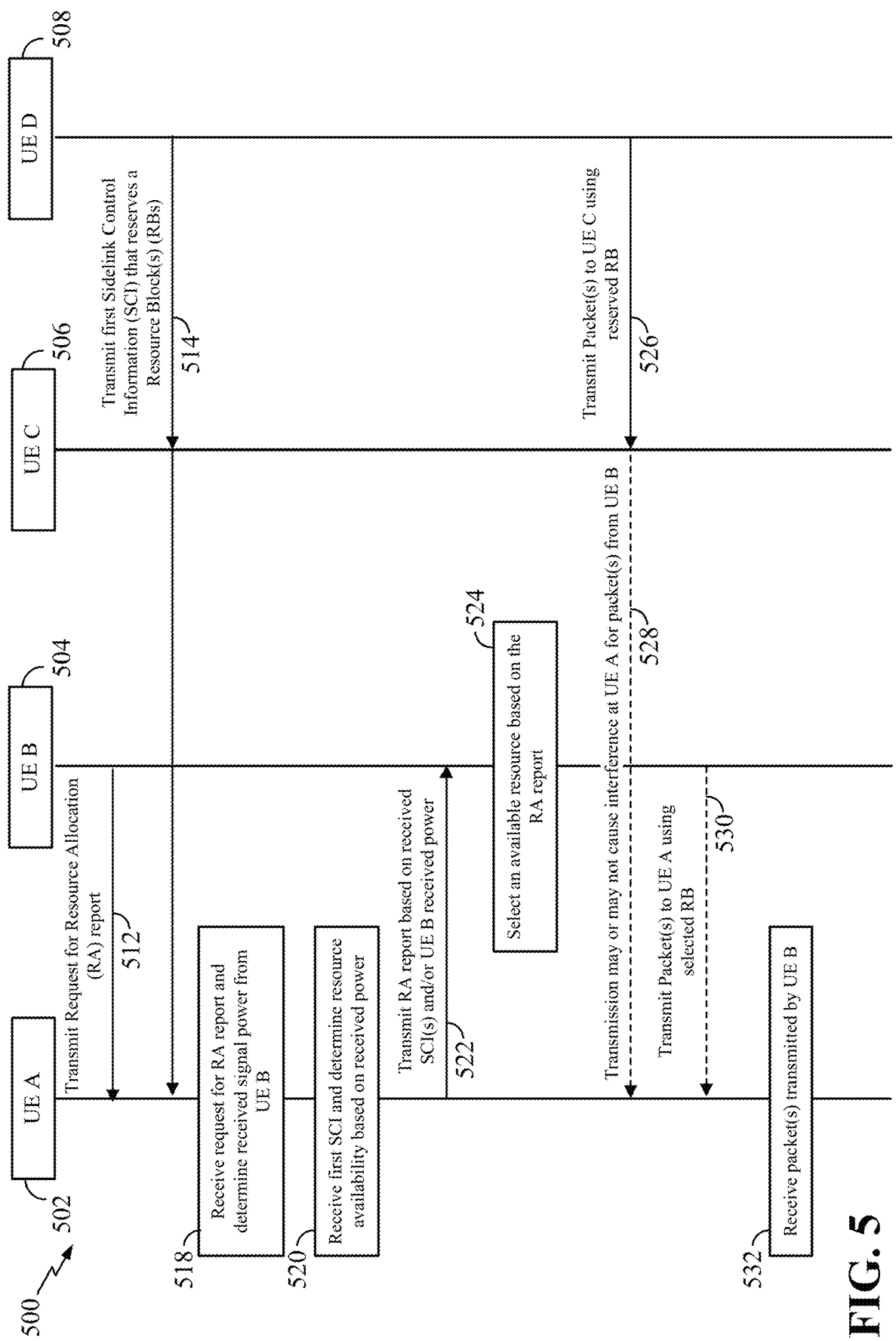
FIG. 5 is a call flow diagram illustrating exemplary sidelink signaling between various user equipments (UEs) to use information from multiple UEs to schedule and transmit data within a wireless communication system in accordance with some aspects of the disclosed subject matter.

FIG. 5 is a signaling diagram illustrating exemplary sidelink signaling between various user equipment devices (e.g., UE A 502, UE B 504, UE C, 506, and UE D 508) to schedule and transmit data within a wireless communication system 500 in accordance with some aspects of the disclosed subject matter. In some aspects, wireless communication system 500 can correspond, for example, to a portion of RAN 100 described above in connection with, and shown in, FIG. 1, and/or a portion of wireless communication system 200 described above in connection with, and shown in, FIG. 2.

In some examples, a base station can provide or assist sidelink resource allocation (RA) for one or more UEs in RAN 100. Such base station-assisted sidelink resource allocation may correspond to gNB-assisted sidelink RA (mode 1) as described in release-16 of 3GPP specifications for 5G NR. In mode 1 sidelink RA, a base station or other scheduling entity schedules sidelink slots for a UE. In other examples, a UE may employ autonomous sidelink resource allocation, which may correspond to autonomous sidelink RA (mode 2) as also described in release-16 of 3GPP specifications for 5G NR. In mode 2 sidelink RA, a UE can select and/or reserve one or more sidelink slots or resources unassisted by a base station. As described below in connection with FIG. 8, a UE that has sidelink data to transmit (e.g., UE 126, UE 132, UE B 504, or UE D 508) can monitor sidelink resources within a sliding sensing window for messages indicating that another UE has reserved a particular set of resources in an upcoming resource selection window corresponding to the current sensing window. For example, a UE may monitor a physical sidelink control channel (PSCCH) for sidelink control information (SCI) messages. These SCI messages can include a reservation for resources associated with one or more upcoming sidelink (SL) slots. In such an example, the UE can decode received SCI messages, and identify reserved resources. In another example, an SCI may indicate that no upcoming resources are reserved by the device that transmitted the SCI.

When a UE transmits an SCI, which may include sidelink resource allocation or reservation information, the UE may include a demodulation reference signal (DMRS) to facilitate channel estimation of the PSCCH and demodulation of the SCI. In a further aspect of this disclosure, a sensing UE may estimate a reference signal received power (RSRP) based on the DMRS included in the SCI, or any other suitable reference signal. In a further example, a sensing UE may estimate an RSRP of a signal transmitted on a sidelink data channel (e.g., a physical sidelink shared channel, PSSCH). Here, the RSRP may be estimated based on a DMRS associated with the message. Thus, a sensing UE can use an RSRP of the SCI and/or an RSRP of a signal transmitted on the PSSCH to determine whether a resource reserved by the device that transmitted the signal is available for use by the sensing UE. For example, a UE can determine an RSRP associated with the device that transmitted the signal, and can compare the RSRP to a suitable RSRP threshold (e.g., a predetermined RSRP threshold). In such an example, if the RSRP is below the threshold, the UE can identify any resources reserved by the device as being available. If the RSRP is above the threshold, the UE can identify any resources reserved by the device as being unavailable. Note that a UE can be configured to identify an RSRP that is equal to the threshold as below the threshold or above the threshold.

In some examples, a sensing UE can determine an average RSRP associated with a particular device based on a suitable number (e.g., a predetermined number) of signals transmitted by the device and/or signals transmitted by the device over a suitable (e.g., predetermined) time period. For example, the UE can record an RSRP for each signal (e.g., a signal transmitted using the PSSCH or PSCCH) the UE detects from a particular UE, and can determine an average of a last three RSRPs. As another example, the UE can record an RSRP for each signal the UE detects from a particular UE, and can determine an average of RSRPs of signals received within the previous 8 slots. As yet another example, the UE can record an RSRP for each signal the UE detects from a particular UE, and can determine an average of up to three RSRPs of signals received within the previous 8 slots. Note that the values are merely examples, and within the present disclosure, reference to such an average should be understood as any suitable combination or aggregation of any suitable number of RSRP values over any suitable period of time. Averaging multiple RSRP values can facilitate a UE in accounting for mobility of the UE that received the signals and/or the device (e.g., UE) that transmitted the signals.

In some aspects, the UE can select one or more of the available resources for a future transmission. Additionally, in some aspects, the UE can transmit an SCI message on the PSCCH indicating that the selected resource is reserved.

Some UEs may be relatively power sensitive (e.g., the UE may have a limited power budget, such as a wearable device or battery operated sensors), and/or may not require low latency communications (e.g., the UE may not transmit data that is relatively insensitive to delay, such as wearable device or an internet-of-things device). Thus, such UEs may prioritize power savings over resource monitoring. For example, such a UE can realize power savings by monitoring fewer resources. That is, monitoring resources can require power to amplify received signals and/or to attempt to decode received signals. However, if a UE anticipates transmitting data using one or more SL slots, monitoring fewer resources may result in the UE having difficulty identifying available resources for transmitting.

Therefore, a further aspect of the present disclosure provides that a UE that anticipates transmitting data using one or more SL slots (which is sometimes referred to herein as a TX UE) can leverage resources of a nearby UE (e.g., a UE that is a target for the data to be transmitted using the one or more SL slots) to increase the fraction of a sensing window that can be monitored and/or to monitor the resources within the sensing window with a finer granularity. For example, the TX UE can request that a nearby UE (which may or may not be a UE that is a target of a transmission from the TX UE, which is sometimes referred to herein as an RX UE) monitor resources in the sensing window and report which resources in a selection window are available and/or unavailable.

In some aspects, a nearby UE and/or RX UE may have a larger power budget for monitoring (e.g., due to a larger battery, due to less power being dedicated to other functions) than the TX UE and/or may be configured to continuously monitor resources for its own purposes. For example, a nearby UE can be a recipient of a transmission by the TX UE (e.g., as a target of a unicast communication or a member of a group of a multicast, groupcast, broadcast, or type of communication configured to transmit from one device to more than one device). Examples below are often described using an RX UE as a particular example of a nearby UE that monitors resources and provides a report to a TX UE. However, this is merely an example, and any nearby UE can monitor resources and provide a report to a TX UE.

In some aspects, an RX UE (e.g., UE A 502, UE C 506) can monitor resources within a sliding sensing window for messages indicating that another UE (e.g., UE D 508) has reserved particular resources in an upcoming resource selection window. For example, the RX UE can monitor the PSCCH for SCI messages that can include a reservation for one or more resources associated with one or more upcoming SL slots. In such an example, the RX UE can decode received SCI messages, and identify resources that the SCI indicates as being reserved.

When a UE transmits an SCI, the UE may include a DMRS in the transmission to facilitate performance of channel estimation of the PSCCH and facilitate decoding of the SCI. Further, when a UE transmits a message on the PSSCH, the UE may include a DMRS for similar reasons. In some aspects, an RX UE can estimate the reference signal received power (RSRP) based on the DMRS included in the SCI, the DMRS included in the PSSCH message, or any other suitable reference signal.

According to a further aspect of the present disclosure, an RX UE can additionally or alternatively use such RSRP of the SCI and/or RSRP of a signal transmitted on the PSSCH to determine whether a resource reserved by the device that transmitted the signal (e.g., UE D 508) is available for use by the TX UE. For example, the RX UE can determine an RSRP associated with the device, and can compare the RSRP to a suitable RSRP threshold (e.g., a predetermined threshold). In such an example, if the RSRP is below the threshold, the UE can identify any resources reserved by the device as being available. If the RSRP is above the threshold, the UE can identify any resources reserved by the device as being unavailable. Note that a UE can be configured to identify an RSRP that is equal to the threshold as below the threshold or above the threshold.

In a still further aspect, an RX UE can determine an average, an aggregate, or other suitable calculation of an RSRP associated with a particular device based on a suitable number (e.g., a predetermined number) of signals transmitted by the device and/or signals transmitted by the device over a suitable (e.g., predetermined) time period. In the present disclosure, reference to an average RSRP should be understood not only referring to an arithmetic mean, but broadly including any average, aggregate, or other suitable calculation based on a plurality of RSRP estimates. For example, the RX UE can record an RSRP for each signal (e.g., a signal transmitted using the PSSCH or PSCCH) the RX UE detects from a particular UE, and can determine an average of a last three RSRPs. As another example, the RX UE can record an RSRP for each signal the RX UE detects from a particular UE, and can determine an average of RSRPs of signals received within the previous 8 slots. As yet another example, the RX UE can record an RSRP for each signal the RX UE detects from a particular UE, and can determine an average of up to three RSRPs of signals received within the previous 8 slots. Note that the values provided above are merely examples, and an RX UE can record and average any suitable number of RSRP values over any suitable period of time.

In some aspects, an RX UE can generate a report indicating which resources in the resource selection window are available and/or which resources are not available. Additionally, in some aspects, the RX UE can transmit such a report to one or more TX UEs (e.g., UE B 504 and/or UE D 508).

A TX UE that receives such a report can utilize the report to supplement sidelink resource allocation information that the TX UE detected, which can provide information about resource availability from multiple locations (e.g., the locations of the TX UE and the RX UE that provided the report).

In some aspects, for example as described below in connection with FIGS. 6 and 9, an RSRP threshold used to determine whether a particular resource is available can be adaptively determined based on an observed received signal power from the TX UE. Alternatively, the RSRP threshold can be a predetermined value based on one or more parameters, such as a priority of a packet(s) being transmitted, a priority of a device(s) to which a transmission is directed, a latency requirement associated with the packet(s), a cast type of the transmission (e.g., unicast, multicast, groupcast, or broadcast), any other suitable parameter, and/or any suitable combination of parameters. In some aspects, accounting for a difference in power of a signal from the TX UE (e.g., UE B 504) and a potentially interfering TX UE (e.g., UE D 508) can facilitate efficient use of resources. For example, if the received power of a transmission from the TX UE observed at the RX UE is at least a threshold amount (e.g., 10 decibels (dB)) greater than the received power of a transmission from the potentially interfering TX UE observed at the RX UE, a transmission from the TX UE to the RX UE can be expected to be received and decoded with relatively high reliability. If the signal from the potentially interfering TX UE (e.g., UE D 508) is only sensed by the TX UE (e.g., UE B 504), the received power at the TX UE (e.g., UE B 504) may be greater than a fixed threshold (and marked unavailable by the TX UE) when the resource can be used for reliable communications to the RX UE.

In some aspects, a TX UE (e.g., UE B 504) can select a resource for transmission randomly from the selection window. For example, a TX UE that is constrained from monitoring for SCI from other UEs can randomly select a resource for transmission. As another example, if there is relatively low congestion (e.g., a relatively low channel busy ration (CBR), a relatively low channel occupancy ration (SL CR)) if the transmission has a relatively low priority, if the transmission has a relatively low reliability requirement, etc., the TX UE can randomly select a resource for transmission (e.g., transmission of a packet(s) to an RX UE). In such an example, monitoring of resources in a sensing window, which can reduce power consumption by the TX UE. In some aspects, UE 504 B can determine a CBR threshold at a higher layer (e.g., an application layer), and can provide the CBR threshold to a lower layer (e.g., a physical layer).

In some aspects, UE B 504 can be configured to transmit data over a sidelink channel (e.g., the physical sidelink shared channel (PSSCH)) to one or more other UEs, such as UE A 502. Additionally, UE C 506 and UE D 508 can represent other UEs that are communicating using the PSSCH, and may cause interference with transmission sent by UE B 504 (e.g., to UE A 504) if they are transmitted using the same resources. In the signaling diagram of FIG. 5, UE A 502, UE B 504, UE C 506, and/or UE D 508 can schedule transmissions autonomously (e.g., using sidelink resource allocation mode 2), as described above in connection with FIG. 5.

At 512, UE B 504 can transmit a request to a nearby UE (e.g., UE A 502) for a resource allocation (RA) report. In some aspects, the request can include any suitable information, such as a priority associated with a transmission (e.g., a priority that is included in sidelink control information (SCI)), a priority associated with a target of the communication (e.g., UE A 502, and/or one or more other UEs). Additionally or alternatively, in some aspects, the request for the RA report can include a request that the UE that receives the request for the RA report use an adaptive threshold when determining whether a particular resource is available or unavailable.

In some aspects, UE B 504 can use any suitable technique or combination of techniques to transmit the request. For example, UE B 504 can transmit the request using any suitable communication network (e.g., via a RAN, such as RAN 100 or RAN 204, using one or more SL slots, etc.). In some aspects, UE B 504 can transmit the request using any suitable communication interface, such as a transceiver (e.g., transceiver 410). In some aspects, UE B 504 can transmit the request using sidelink resources (e.g., PSCCH and/or PSSCH). In some aspects, information related to the request (e.g., a source ID, an SIR threshold, etc.) can be transmitted using PSSCH.

In some aspects, UE B 504 can be transmit a request using reserved resources (e.g., reserved using sidelink control information (SCI), as described above in connection with FIG. 5). Additionally or alternatively, UE B can be transmit a request using resources that are pre-configured to transmit requests for resource allocation reports report (e.g., resources defined in a standard as designated for transmission of requests for resource allocation reports report). Such pre-configured resources can be designated for transmitting requests for resource allocation reports, and may or may not be restricted to only transmitting requests for resource allocation reports.

At 514, UE D 508 can transmit a first SCI message that includes a reservation for resources. For example, as described above in connection with FIG. 5, the SCI can reserve one or more resources for UE D 508 to transmit data (e.g., one or more packets) in a resource selection window. In some aspects, the first SCI message can include a destination ID (e.g., identifying information associated with a particular UE, identifying information associated with a group for groupcast transmission, etc.).

In some aspects, UE D 508 can use any suitable technique or combination of techniques to transmit the first SCI. For example, UE D 508 can transmit the request using any suitable communication network (e.g., via a RAN, such as RAN 100 or RAN 204, using one or more SL slots, etc.). In some aspects, UE D 508 can transmit the SCI using any suitable communication interface, such as a transceiver (e.g., transceiver 410). In some aspects, UE D 508 can transmit the request using PSCCH.

At 518, UE A 502 can receive the request for an RA report and/or any other suitable signal transmitted by UE B 504 using any suitable technique or combination of techniques. In some aspects, UE A 502 can use any suitable technique or combination of techniques to receive the request for an RA. For example, UE A 502 can sample and buffer a received wireless signal encoded with information included in the request, and apply suitable processing to the buffered signal such as energy detection, demodulation, decoding, etc. In some aspects, UE A 502 can receive request using any suitable communication interface, such as a transceiver (e.g., transceiver 410). In some aspects, UE A 502 can receive the request using sidelink resources (e.g., PSSCH and/or PSSCH). For example, information associated with the request can be transmitted using PSSCH.

In some aspects, UE A 502 can determine a received power of a signal transmitted by UE B 504 using any suitable technique or combination of techniques. For example, UE A 502 can determine a received power by estimating a reference signal received power (RSRP) based on a demodulation reference signal (DMRS) included in a transmission from UE B 504. In a more particular example, the DMRS can be included in an SCI message transmitted by UE B 504, and/or any other suitable message transmitted using the PSCCH. As another more particular example, the DMRS can be associated with a message transmitted by UE B 504 using the PSSCH.

In some aspects, UE A 502 may not measure the received power of a signal transmitted by UE B for the express purpose of determining resource availability. However, in general UE A 502 can be configured to determine the RSRP of signals transmitted by UE B for other operations, such as channel estimation.

At 520, UE A 502 can receive the first SCI message transmitted by UE D 508 at 514. Additionally, in some aspects, at 520, UE A 502 can determine resource availability based on information in the first SCI using any suitable technique or combination of techniques. For example, UE A 502 can use one or more techniques described above in connection with FIG. 5, one or more techniques described below in connection with FIGS. 11, 13A, and/or 15. Although not shown, UE A 502 can receive SCI messages from any suitable number of UEs that are proximate to UE A 502 (e.g., in addition the first SCI message). In such examples, UE A 502 can determine resource availability using information derived from any or all of the received SCI messages.

In some aspects, UE A 502 may not receive the first SCI message transmitted by UE D 508 at 514. For example, UE A 502 may be sufficiently distant (e.g., physical distance and/or RF distance) that UE A 502 cannot reliably receive and/or decode the first SCI message.

In some aspects, UE A 502 can use any suitable technique or combination of techniques to receive the first SCI message. For example, UE A 502 can sample and buffer a received wireless signal encoded with information included in the SCI, and apply suitable processing to the buffered signal such as energy detection, demodulation, decoding, etc. In some aspects, UE A 502 can receive the first SCI message using any suitable communication interface, such as a transceiver (e.g., transceiver 410). In some aspects, UE A 502 can receive the first SCI message using PSCCH.

In some aspects, UE A 502 (and/or UE B 504) can use a fixed threshold to determine which resources are available. For example, UE A 502 may measure an RSRP for a signal from UE D 508 of −102 decibel-milliwats (dBm) (e.g., $RSRP_{D \to A}$=−102 dBm), and an RSRP for a signal from another UE (e.g., UE C 504 is used in this example for convenience) of −92 dBm (e.g., $RSRP_{C \to A}$=−92 dBm). In the example, UE A 502 can determine a fixed threshold for received signals that can be used to identify which signals are likely to cause an unacceptable level of interference. In the example, UE A 502 sets the threshold at −107 dBm based on a priority associated with a transmission (e.g., $Prior_B$, reported in SCI from UE B 504). As another example, UE A 502 can receive a value at which to set the threshold from UE B 504 (e.g., in associated with a request, such as the request transmitted by UE B 504 at 512). As yet another example, UE A 502 can determine a priority in a higher layer (e.g., an application layer) based on a QoS target, $Prior_A$, $Prior_B$, and/or any other suitable factors, and can provide the priority to a lower layer (e.g., a physical layer) In some aspects, UE B 502 can set an RSRP threshold based on a priority associated with a transmission (e.g., $Prior_B$) and/or a device priority associated with UE A 502 (e.g., $Prior_A$, assigned by an application that maintains a connection to UE A). In general, priority can be a value, which can represent, for example, a latency requirement, and/or any other suitable reliability requirement(s). In such an example, UE A 502 can determine that resources reserved by UE C 506 or UE D 508 are unavailable, because the RSRP measured for signals from UE C 506 and UE D 508 are above the threshold.

In some aspects, UE A 502 can use an adaptive threshold and/or a signal-to-interference (SIR) threshold based on a power of a signal received from a transmitting UE (e.g., UE B 504) to determine which resources are available. For example, UE A 502 may measure the same RSRP from UE C 506 and UE D 508 as in the preceding example (e.g., $RSRP_{C \to A}$=−92 dBm, and $RSRP_{D \to A}$=−102 dBm), and an RSRP for a signal from UE B of −90 dBm (e.g., $RSRP_{B \to A}$=−90 dBm). In the example, UE A 502 can determine an SIR threshold representing a ratio between signal power of a desired signal (e.g., a signal from UE B 502) and a potentially interfering signal (e.g., a signal from UE C 506 and/or UE D 508). In the example, UE A 502 sets the SIR threshold at 10 dB based on a priority associated with a transmission, a device priority associated with UE A 502, and/or any other suitable factor(s), such as a modulation and coding scheme (MCS) used by UE B 504 to transmit the signal. (e.g., a lower code rate and/or lower modulation order can be more robust to interference, while higher code rates and/higher modulation order can be more sensitive to interference).

In a particular example, UE A 502 can determine an SIR between the TX UE and a potentially interfering UE (e.g., SIR(B, C)=−92 dBm−(−90 dBm)=2 dB, and SIR(B, D)=−102 dBm−(−90 dBm)=12 dB), which UE A 502 can compare to the SIR threshold. In such an example, UE A 502 can determine that resources reserved by UE C 506 are unavailable because SIR(B,C) is less than the SIR threshold, while resources reserved by UE D 508 are available because SIR(B,D) satisfies the SIR threshold. Note that because subtraction of two values in the log domain corresponds to division in the linear domain followed by conversion to the log domain. Accordingly, SIR can be calculated by subtracting an RSRP of the interfering signal(s) expressed in the log domain (e.g., dBm) from the RSRP of the desired signal expressed in the log domain.

Additionally or alternatively, in another particular example, UE A 502 can determine an adaptive RSRP threshold based on the SIR threshold and the RSRP of a signal received from the transmitting UE (e.g., $RSRP_{adpt-thr}=RSRP_{B \to A}-SIR_{thr}$). In the example, UE A 502 can calculate the adaptive threshold ($RSRP_{adpt-thr}$=−90 dB−10 dB=−100 dB. In such an example, UE A 502 can determine that resources reserved by UE C 506 are unavailable because $RSRP_{C \to A}$ exceeds the adaptive RSRP threshold (e.g., −92 dBm>−100 dBm), while resources reserved by UE D 508 are available because, and $RSRP_{D \to A}$ satisfies the adaptive RSRP threshold (e.g., −102 dBm<−100 dBm).

Note that although the preceding examples are described using a single RSRP value for each UE, this is merely an example, and any suitable number of RSRP values can be averaged to identify an RSRP value to be compared to a threshold and/or to estimate an SIR. Additionally, although described in connection with UE A 502, UE B 504 can be configured to use a fixed RSRP threshold, an SIR threshold, and/or an adaptive RSRP threshold. For example, UE A 502 can include RSRP values associated with another UE (e.g., UE D 508) measured at UE A 502, an RSRP value associated with UE B 504, one or more SIR values (e.g., based on a comparison of a link between UE B 504 and UE A 502, and a link between another UE, such as UE D 508, and UE A 502), and/or any other suitable values.

In some aspects, UE A 502 can set the $SIR_{threshold}$ based on one or more parameters. For example, if UE A 502 receives and/or otherwise determines a modulation and coding scheme (MCS) index to be utilized by UE B 504, UE A 502 can use the MCS index to set the $SIR_{threshold}$. As another example, UE A 502 can set the $SIR_{threshold}$ based on quality of service (QoS) targets of UE B 504 and/or UE A 502.

In some aspects, the $SIR_{threshold}$ can be set in a range of about 0 dB to about 20 dB. For example, a very low code rate and low modulation order (e.g., QPSK), UE A 502 can set the SIR threshold relatively low (e.g., 0 dB. 1 dB, 5 dB). As another example, for 64-QAM modulation with relatively high channel code rate, UE A 502 can set the SIR threshold relatively high (e.g., about 20 dB). However, these are merely examples, and the $SIR_{threshold}$ can be set to various values (e.g., any value in the range from about 0 dB to about 20 dB). Alternatively, in some aspects, the $SIR_{threshold}$ can be fixed (e.g., at a particular value, such as 7, dB, 8 dB, 9 dB, 10 dB, 11 dB, 12 dB, etc.). In some aspects, the $SIR_{threshold}$ can be provided to UE A 502 by UE B 504 (e.g., in connection with a request for a report).

In some aspect, at 520, UE A 502 can determine and/or retrieve a parameter related to a target reliability for transmissions (e.g., to UE A 5702), and/or a parameter that can be used to estimate a likely reliability of transmissions (e.g., to UE A 502). In some aspects, the parameter can be based on signals detected and/or received prior to 520, such as an SCI and/or message including a packet transmitted at 812. For example, UE A 502 can determine a channel busy ratio (CBR) (e.g., based on a fraction of subframes for which received signal strength indicator (RSSI) exceeds a pre-configured value over a predetermined period of time) as a parameter that can be used to estimate congestion of communication system 500. In a particular example, if UE A 502 determines that network load in the proximity of UE A 504 is relatively light (e.g., a CBR less than of less than about 0.5, a CBR of less than about 0.8, or any other suitable CBR threshold), UE A 502 can select a first technique for determining resource availability (e.g., a technique in which a fixed RSRP threshold is used). Otherwise, if UE A 502 determines that network load in the proximity of UE A 502 is not relatively light (e.g., CBR is over the threshold), UE A 502 can select a second technique for determining resource availability (e.g., e.g., a technique in which an adaptive RSRP threshold is used). In some aspects, UE 502 A can determine a CBR threshold at a higher layer (e.g., an application layer), and can provide the CBR threshold to a lower layer (e.g., a physical layer).

At 522, UE A 502 can transmit an RA report based on a received power in the first SCI message and/or based on the UE B received power. In some aspects, the report can include a binary resource availability map (e.g., formatted as a matrix or string) that represents at least a portion of a resource selection window (e.g., as described above in connection with FIG. 5, and below in connection with FIG. 7).

In some aspects, UE A 502 can use any suitable technique or combination of techniques to transmit the RA report. For example, UE A 502 can transmit the request using any suitable communication network (e.g., via a RAN, such as RAN 100 or RAN 204, using one or more SL slots, etc.). In some aspects, UE A 502 can transmit the RA report using any suitable communication interface, such as a transceiver (e.g., transceiver 410). In some aspects, UE A 502 can transmit the RA report using a SL report link (e.g., sidelink report link 226 described above in connection with FIG. 2).

At 524, UE B 504 can receive the report and select an available resource based on the report received from UE A 502. In some aspects, the resource availability determined by UE B 504 can be formatted as a binary resource availability map.

In some aspects, UE B 504 can use any suitable technique or combination of techniques to receive the RA report transmitted by UE A 502. For example, UE B 504 can sample and buffer a received wireless signal encoded with information included in the RA report, and apply suitable processing to the buffered signal such as energy detection, demodulation, decoding, etc. In some aspects, UE B 504 can receive the RA report using any suitable communication interface, such as a transceiver (e.g., transceiver 410). In some aspects, UE B 504 can receive the RA report using a SL report link (e.g., sidelink report link 226 described above in connection with FIG. 2).

In some aspects, UE B 504 can randomly select an available resource from the available resources identified in the report and/or resource availability information derived by UE B 504. For example, as described below in connection with FIG. 7, a portion of the resource selection window may not be suitable for selection (e.g., due to processing time associated with formatting a packet to be transmitted).

At 526, UE D 508 can transmit one or more packets intended for at least UE C using resources reserved by the first SCI. In some aspects, UE D 508 can use any suitable technique or combination of techniques to transmit the one or more packets. For example, UE D 508 can transmit the one or more packets using any suitable communication network (e.g., via a RAN, such as RAN 100 or RAN 204, using one or more SL slots, etc.). In some aspects, UE D 508 can transmit the one or more packets using any suitable communication interface, such as a transceiver (e.g., transceiver 410). In some aspects, UE D 508 can transmit the one or more packets using PSSCH.

At 528, the signal transmitted by UE D 508 at 526 may or may not interfere with a signal transmitted by UE B 504 to UE A 502. For example, if the selected resource to transmit one or more packets to UE A 502 is the same resource that UE D 508 used to transmit a message to UE C 506, the signal can cause at least some interference at UE A 502, which may reduce the likelihood that UE A 502 can reliability receive and/or decode a signal transmitted by UE B 504. As described below in connection with FIG. 9, UE A 502 and/or UE B 504 can determine (e.g., at 520 or 516, respectively) that the amount of interference likely to be caused by the signal transmitted by UE D 508 at UE A 502 is unlikely to substantially reduce reliability below an acceptable level (e.g., less than about a 1% chance, less than about a 5% chance, less than about a 10% chance, etc.).

At 530, UE B 504 can transmit one or more packets intended for at least UE A using resources selected at 524. As described above, the resource can be a resource that is used by another relatively nearby UE (e.g., that is unlikely to interfere with reception at UE A 502) or a resource that is not used by any nearby UE. In some aspects, UE B 504 can use any suitable technique or combination of techniques to transmit the one or more packets. For example, UE B 504 can transmit the one or more packets using any suitable communication network (e.g., via a RAN, such as RAN 100 or RAN 204, using one or more SL slots, etc.). In some aspects, UE B 504 can transmit the one or more packets using any suitable communication interface, such as a transceiver (e.g., transceiver 410). In some aspects, UE B 504 can transmit the one or more packets using PSSCH.

At 532, UE A 502 can receive the packet(s) transmitted by UE B 504 that was transmitted using the selected resource. In some aspects, UE A 502 can use any suitable technique or combination of techniques to receive the packets(s) transmitted by UE B 504. For example, UE A 502 can sample and buffer a received wireless signal encoded with information included in the packet(s), and apply suitable processing to the buffered signal such as energy detection, demodulation, decoding, etc. In some aspects, UE A 502 can receive the packet(s) using any suitable communication interface, such as a transceiver (e.g., transceiver 410). In some aspects, UE A 502 can receive the packet(s) using PSSCH. Note that although not shown, in some aspects, UE B 504 can transmit an SCI message reserving the resource selected at 524.

Figure 6:
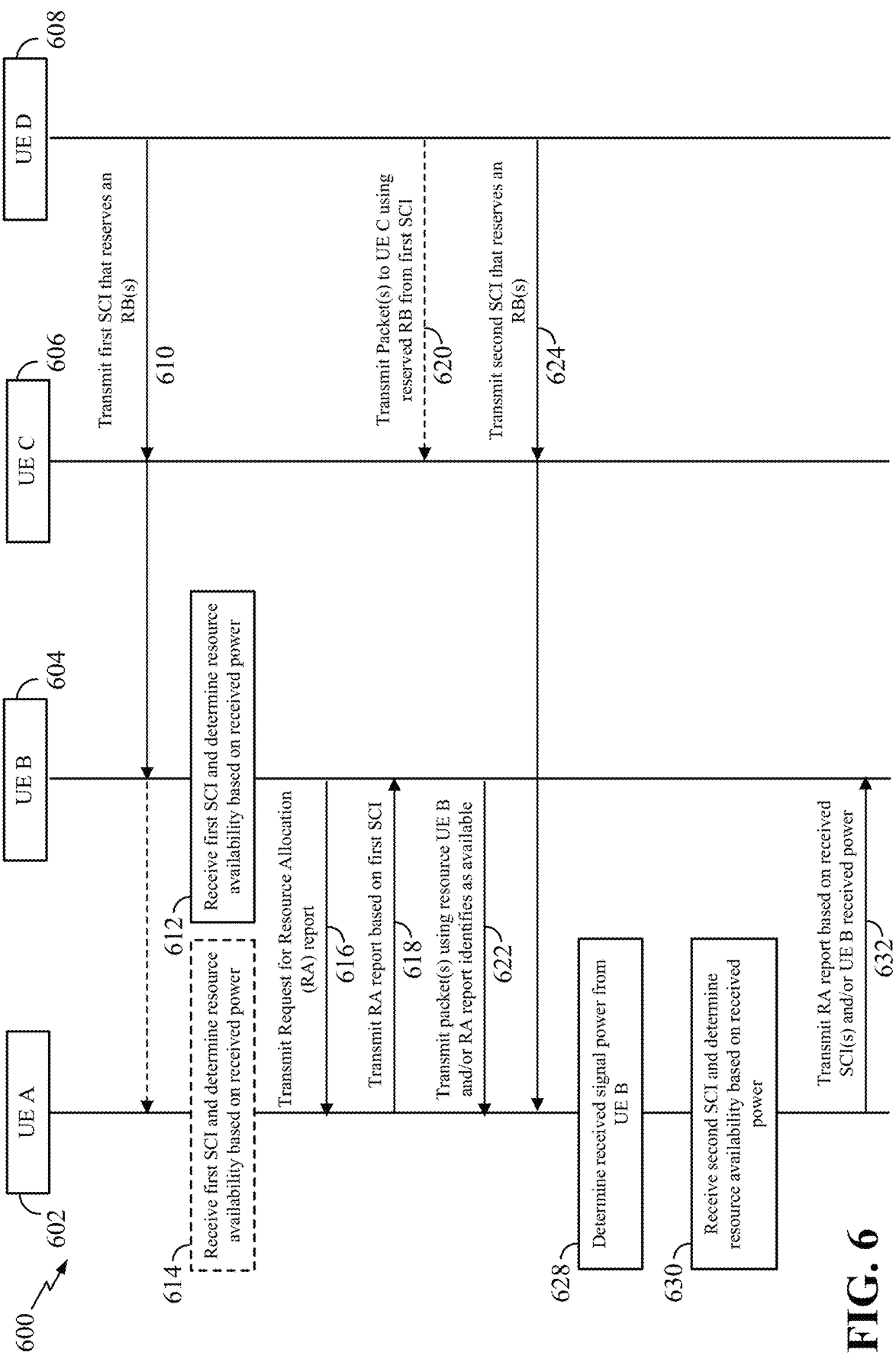
FIG. 6 is a call flow diagram illustrating exemplary sidelink signaling between various UEs to monitor resources using a different resource selection technique after a transmitting UE requests assistance monitoring resources from another UE within a wireless communication system in accordance with some aspects of the disclosed subject matter.

FIG. 6 is a signaling diagram illustrating exemplary sidelink signaling between various UEs (e.g., UE A 502, UE B 504, UE C, 506, and UE D 508) to monitor resources using a different resource selection technique after a transmitting UE requests assistance monitoring resources from another UE within a wireless communication system 600 in accordance with some aspects of the disclosed subject matter. In some aspects, wireless communication system 600 can correspond, for example, to a portion of RAN 100, wireless communication system 200, and/or wireless communication system 500 described above in connection with FIGS. 1, 2, and/or 5, respectively.

In some aspects, UE B 604 can be configured to transmit data over the PSSCH to one or more other UEs, such as UE A 602. Additionally, UE C 606 and UE D 608 can represent other UEs that are communicating using the PSSCH, and may cause interference with transmission sent by UE B 604 (e.g., to UE A 604) if they are transmitted using the same resources. In the signaling diagram of FIG. 6, UE A 602, UE B 604, UE C 606, and/or UE D 608 can schedule transmissions autonomously (e.g., using sidelink resource allocation mode 2), as described above in connection with FIG. 5.

At 610, UE D 608 can transmit a first SCI message that includes a reservation for resources. For example, as described above in connection with FIG. 5, the SCI can reserve one or more resources for UE D 608 to transmit data (e.g., one or more packets) in a resource selection window. In some aspects, UE D 608 can transmit the SCI using any suitable technique or combination of techniques, such as techniques described above in connection with 514 of FIG. 5.

At 612, UE B 604 can receive the first SCI message transmitted by UE D 608 at 610. In some aspects, UE B 604 can use any suitable technique or combination of techniques to receive the first SCI message, such as techniques described above in connection with 514 of FIG. 5. Additionally, in some aspects, at 612, UE B 604 can determine resource availability based on information in the first SCI using any suitable technique or combination of techniques, such as techniques described above in connection with 516 of FIG. 5.

At 614, UE A 602 can receive the first SCI message transmitted by UE D 608 at 610. Additionally, in some aspects, at 614, UE A 602 can determine resource availability based on information in the first SCI using any suitable technique or combination of techniques, such as techniques described above in connection with 520 of FIG. 5. For example, UE A 602 can determine resource availability using a fixed RSRP threshold (e.g., because UE A 602 has not received a transmission from UE B 604 that can be used to determine SIR, because a threshold amount of time has elapsed since a previous transmission from UE B 604 was received, because the number of transmissions received from UE B 604 within a predetermine period of time is less than a minimum number, etc.).

In some aspects, UE A 602 may not receive the first SCI message transmitted by UE D 608 at 610. For example, UE A 602 may be sufficiently distant (e.g., physical distance and/or RF distance) that UE A 602 cannot reliably receive and/or decode the first SCI message. A In some aspects, UE A 602 can monitor resources in a sensing window regardless of whether UE A 602 has received an explicit request to monitor such resources. Alternatively, in some aspects, UE A 602 can monitor resources in a sensing window only after UE A 602 has received an explicit request to monitor such resources. For example, UE A 602 can begin monitoring such resources in response to receiving a request, and can continue monitoring for a predetermined period of time after receiving the request, for a predetermined time after receiving a most recent transmission from the requesting UE, and/or until receiving an explicit request to stop monitoring resources for a particular UE.

In some aspects, UE A 602 can monitor resources in a resource selection window continuously, and can transmit an RA report periodically with a pre-defined period (e.g., as a unicast to any UE(s) that requested such a report, as a multicast or groupcast to multiple one or more UE(s) that requested such a report, and/or as a broadcast to any nearby UEs that are capable of receiving and demodulating the report). For example, UE A 602 can be configured to transmit a report every N slots (e.g., every 8 slots).

Particularly, in this second case with periodic reporting, the last reception from TX-UE might be too old to be utilized for SIR calculation and in this case RX-UE might fall back to legacy fixed RSRP thresholding. Definition of too old may be based on application and in particular, the mobility of the UEs.

At 616, UE B 604 can transmit a request to a nearby UE (e.g., UE A 602) for a resource allocation (RA) report. In some aspects, the request can include any suitable information, such as information described above in connection with 512 of FIG. 5. In some aspects, the request can be transmitted using any suitable technique or combination of techniques, such as techniques described above in connection with 512 of FIG. 5.

At 618, UE A 602 can transmit an RA report based on a received power in the first SCI message and/or received power in any other SCI messages that reserve a resource in the resource sensing window. In some aspects, the report can include a binary resource availability map (e.g., formatted as a matrix or string) that represents at least a portion of a resource selection window (e.g., as described above in connection with FIG. 5, and below in connection with FIG. 6). In some aspects, UE A 602 can use any suitable technique or combination of techniques to submit the report, such as techniques described above in connection with 522 of FIG. 5.

At 620, UE D 608 can transmit one or more packets intended for at least UE C using resources reserved by the first SCI. In some aspects, UE D 608 can transmit the one or more packets using any suitable technique or combination of techniques, such as techniques described above in connection with 526 of FIG. 5.

At 622, UE B 604 can transmit one or more packets intended for at least UE A 602 using resources selected from a set of resources that UE B 604 determines are available based on information detected by US B 604 and/or the report received at 618 (e.g., using any suitable technique or combination of techniques described above in connection with 524 of FIG. 5).

At 624, UE D 608 can transmit a second SCI that reserves one or more resources in a resource selection window. In some aspects, UE D 608 can transmit the SCI using any suitable technique or combination of techniques, such as techniques described above in connection with 514 of FIG. 5.

At 628, UE A 602 can determine a received power of a signal transmitted by UE B 604 using any suitable technique or combination of techniques, such as techniques described above in connection with 518 of FIG. 5.

At 630, UE A 602 can receive the second SCI message transmitted by UE D 608 at 624. In some aspects, UE B 604 can use any suitable technique or combination of techniques to receive the second SCI message, such as techniques described above in connection with 516 of FIG. 5. Additionally, in some aspects, at 630, UE A 602 can determine resource availability based on information in the first SCI using any suitable technique or combination of techniques, such as techniques described above in connection with 516 of FIG. 5.

At 632, UE A 602 can transmit a second RA report based on the second SCI and/or any other suitable SCI, and/or based on the UE B received power. In some aspects, UE B 604 can use any suitable technique or combination of techniques to transmit the second RA report, such as techniques described above in connection with 522 of FIG. 5.

Although not shown, UE B 604, UE D 608, and UE A 602, can perform similar actions to those described above in connection with 524 to 532 of FIG. 5, such as selecting a resource based on the second RA report, transmitting a packet using the selected resource, and receiving the transmitted packet.

Figure 7:
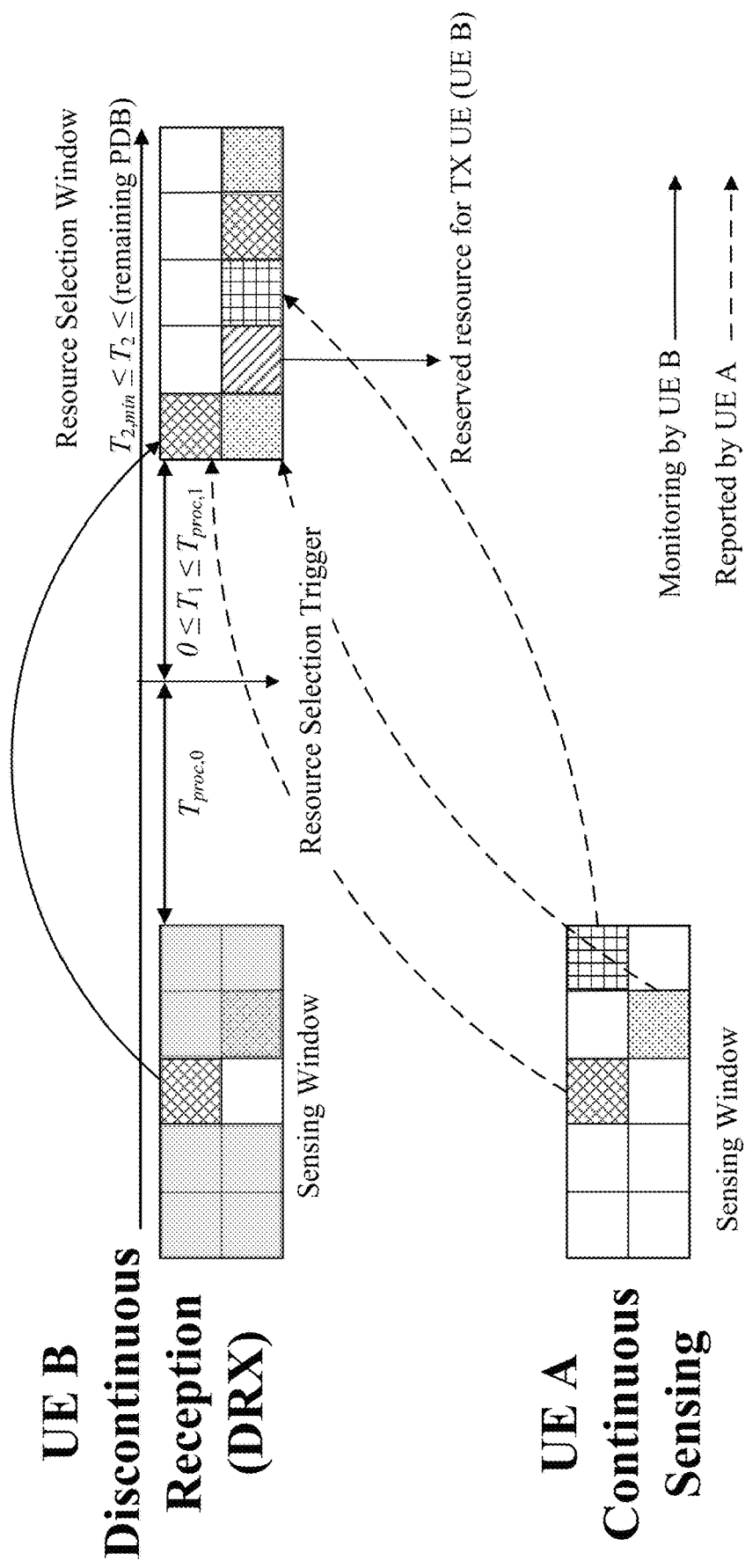
FIG. 7 is an example of signals detected in a sensing window and resources reserved in a resource selection window that a user equipment can use to select a resource to use to transmit data in accordance with some aspects of the disclosed subject matter.

FIG. 7 is an example of signals detected in a sensing window and resources reserved in a resource selection window that a user equipment can use to select a resource to use to transmit data in accordance with some aspects of the disclosed subject matter. As shown in FIG. 7, a transmitting UE (e.g., UE B) and/or a receiving UE (e.g., UE A) can both be configured to monitor a sensing window for transmissions (e.g., SCI messages). In the example of FIG. 7, both UEs are monitoring the sensing window, but UE B is configured to operate using a discontinuous reception interval (shown greyed out in FIG. 7). As shown in FIG. 7, this can cause UE B to miss SCI messages. However, as described above, mechanisms described herein can use monitoring results generated by a single device (e.g., UE A) to determine which resource are and are not available in the resource selection window.

As conceptually illustrated in FIG. 7, a transmission received in the sensing window can include a reservation for one or more resources in the resource selection window.

Additionally, a (variable) gap can exist between the sensing window and the earliest time in the selection window that UE B can select for transmission of a packet. For example, a processing time $T_{proc,0}$ can represent an amount of time that UE B spends processing received signals to determine whether a particular resource in the resource selection window has been reserved. For example, to determine whether a particular resource in the resource selection window has been reserved, UE B can receive an SCI, decode the SCI, and determine which resource(s) are reserved by the SCI.

As another example, a processing time $T_{proc,1}$ can represent an amount of time that UE B spends to select a particular resource after a resource selection has been triggered (e.g., when a packet is received for transmission, e.g., from a processor of UE B).

As yet another example, the total time period represented in the sensing window and the resource selection window can be a time $T_2$ that is at least a minimum value (e.g., $T_{proc,0}+T_{proc,1}$) and no greater than a remaining packet delay budget.

Figure 8:
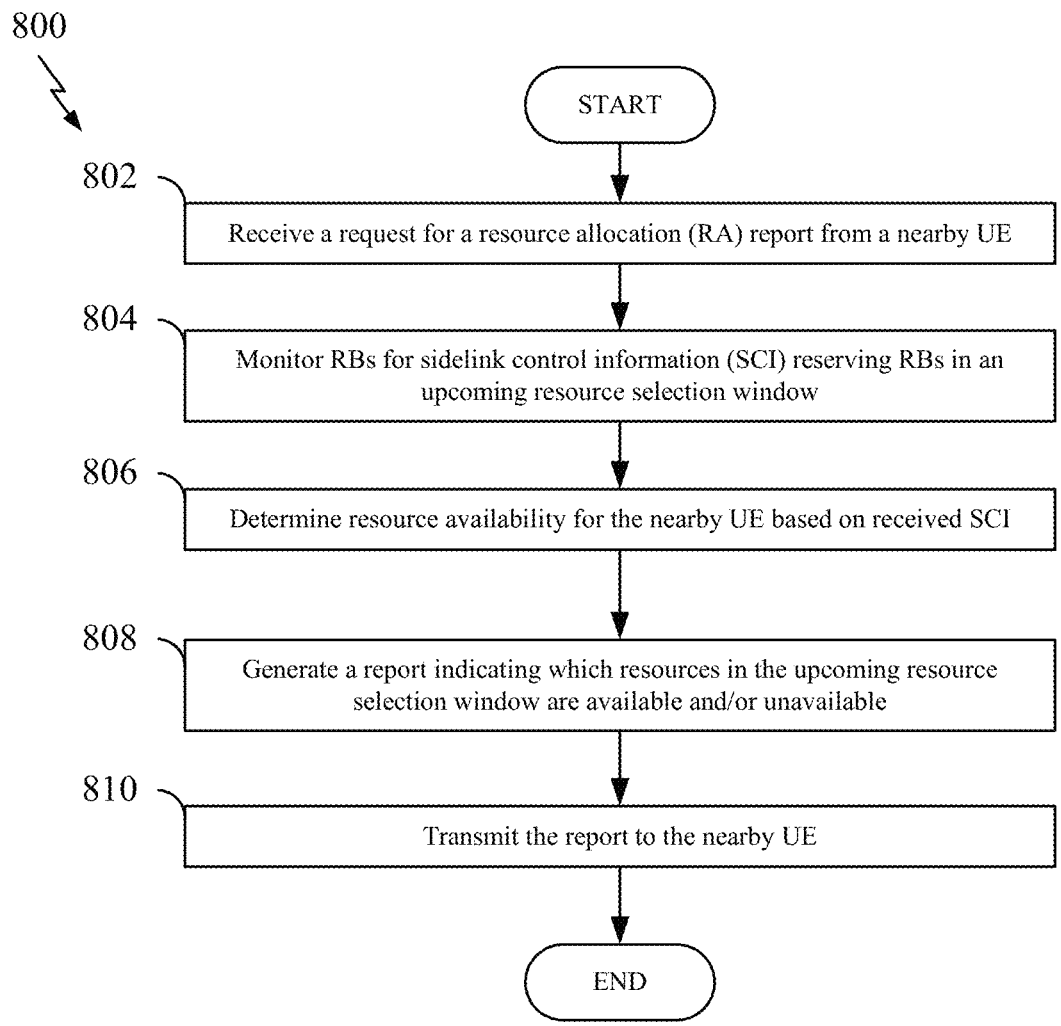
FIG. 8 is an example of reports generated by a transmitting UE and an assisting UE for an upcoming resource selection window, and a combined report that can be used to select a resource to use to transmit data in accordance with some aspects of the disclosed subject matter.

FIG. 8 is a flow chart illustrating an exemplary process 800 for an assisting user equipment to generate a report for a transmitting UE indicating which resources are available and/or unavailable for selection by the transmitting UE in an upcoming resource selection window in accordance with some aspects of the disclosed subject matter.

At 802, a UE (e.g., an RX UE, such as UE 128, UE 206a, UE A 502, etc.) can receive a request for a resource allocation report (RA) from a nearby UE (e.g., a TX UE, such as UE 126, UE 206b, UE B 504, etc.). In some aspects, the UE can receive the request using any suitable technique or combination of techniques, such as techniques described above in connection with 518 of FIG. 5.

At 804, a UE can monitor resources within a resource sensing window for sidelink control information (SCI) that may include reservations for resources within a resource selection window. In some aspects, the UE can use any suitable technique or combination of techniques to monitor the resources, such as techniques described above in connection with 516 and/or 520 of FIG. 5.

At 806, a UE can determine resource availability for the nearby UE (e.g., the UE from which the request for an RA report was received at 802) based on reservations and/or received power of signals received at 804, such as SCI messages. In some aspects, the UE can use any suitable technique or combination of techniques to determine resource availability. For example, the UE can use techniques described above in connection with 520 and/or 524 of FIG. 5. For example, the UE can use a fixed RSRP threshold to determine which resources are available and/or which are unavailable. As another example, the UE can use an adaptive RSRP threshold and/or an SIR threshold to determine which resources are available and/or which are unavailable.

At 808, a UE can generate a report indicating which resources in the resource selection window are available and/or unavailable. In some aspects, the UE can use any suitable technique or combination of techniques to generate an RA report at 1208, such as techniques described above in connection with 520 of FIG. 5.

At 810, a UE can transmit the report generated at 808 to the nearby UE. In some aspects, the UE can use any suitable technique or combination of techniques to transmit the report to the nearby UE, such as techniques described above in connection with 522 of FIG. 5.

Figure 9:
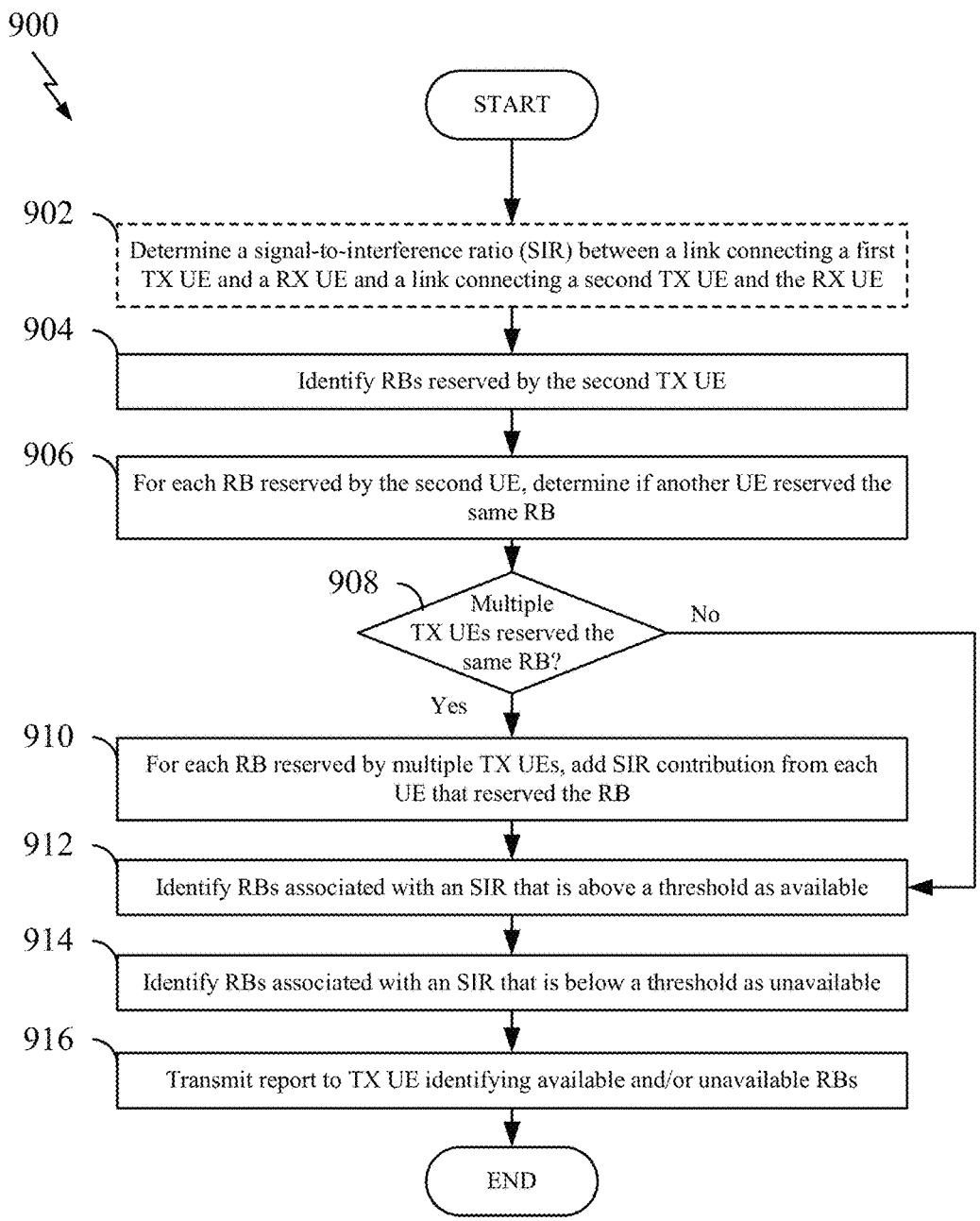
FIG. 9 is a flow chart illustrating an exemplary process for a transmitting UE to sense resources that are reserved but have a relatively low level of interference with a link between the transmitting UE and the receiving UE(s) in accordance with some aspects of the disclosed subject matter.

FIG. 9 is a flow chart illustrating an exemplary process 900 for a transmitting UE to sense resources that are reserved but have a relatively low level of interference with a link between the transmitting UE and the receiving UE(s) in accordance with some aspects of the disclosed subject matter.

At 902, a UE (e.g., UE 126, UE 128, UE 130, UE 132, UE 206a, UE 206b, UE A 502, UE B 504, etc.) can determine a signal-to-interference ratio (SIR) between a first link connecting a first TX UE and an RX UE, and a second link connecting a second TX UE and the RX UE.

For example, the UE can determine an SIR between a first link connecting UE B 504 and UE A 502, and a second link connecting UE C 506 and UE A 502.

As another example, the UE can determine an SIR between a first link connecting UE B 504 and UE A 502, and a second link connecting UE D 508 and UE A 502.

In some aspects, the UE can determine the SIR based on values that it has measured. For example, if the UE executing process 900 is an RX UE (e.g., UE A 502), the UE can determine the SIR based on reference signal received power (RSRP) estimates that the UE generated based on signals received by the UE.

In addition to, or in lieu of, determining the SIR at 902, in some aspects, a UE can determine an adaptive RSRP threshold (e.g., as described above in connection with FIG. 5) based on an SIR threshold and an RSRP at an RX UE. For example, if the UE determines an adaptive RSRP threshold, the UE can compare an RSRP from a potentially interfering TX measured at an RX UE to the RSRP threshold to determine if transmission from the potentially interfering TX are likely to interfere with a transmission to the RX UE. Accordingly, in some aspects, 902 can be omitted.

At 904, a UE can identify resources reserved by the second UE. In some aspects, the UE can use any suitable technique or combination of techniques to identify resources reserved by the second UE. For example, as described above in connection with 516 and 520 of FIG. 5, the UE can receive SCI from the second UE that reserves resources, and can identify the reserved resources by decoding the SCI.

At 906, a UE can determine, for each resource reserved by the second UE, if another UE reserved the same resource. For example, the UE can execute 902 and/or 904 for any number of nearby UEs (e.g., any TX UE that transmits an SCI that can be decoded by the UE), and can identify resources that are reserved by multiple UEs.

If a UE determines that there are multiple reservations for a common resource ("YES" at 908), process 900 can move to 910. At 910, a UE can determine an aggregate SIR (or total RSRP) based on the RSRP of each potentially interfering link. For example, the UE can aggregate an RSRP from each potentially interfering link. For example, the UE can sum the RSRPs from each potential interfering UE in the linear domain (e.g., $\Sigma_{i=1}^{N} RSRP_{UE_i \rightarrow UE_A}$, where N is the number of potentially interfering UEs). In such an example, the aggregate power can be converted into a log domain value to facilitate comparison to an RSRP threshold in the log domain. In such an example, the UE can determine an aggregate SIR (e.g., by subtracting an aggregated RSRP in the log domain from the RSRP of the desired link in the log domain). Alternatively, the UE can compare the aggregate RSRP to an adaptive RSRP threshold (e.g., as described above in connection with FIG. 5).

Otherwise, for resources that are not associated with multiple reservations, ("NO" at 908), process 900 can move to 912. At 912, a UE can identify resources that are associated with an SIR that is above the SIR threshold as available resources. In some aspects, a UE can identify resources that are associated with an SIR that is above the SIR threshold by comparing an RSRP of a potentially interfering link(s) to an adaptive RSRP threshold (e.g., if the interfering RSRP is below the adaptive RSRP threshold the resource can be identified as available, as the power of the interfering link(s) is sufficiently lower than the desired signal).

At 914, a UE can identify resources that are associated with an SIR that is below the SIR threshold as unavailable resources. In some aspects, a UE can identify resources that are associated with an SIR that is below the SIR threshold by comparing an RSRP of a potentially interfering link(s) to an adaptive RSRP threshold (e.g., if the interfering RSRP is above the adaptive RSRP threshold the resource can be identified as unavailable, as the power of the interfering link(s) is not sufficiently lower than the desired signal and is likely to cause an unacceptable level of interference).

At 916, a UE can transmit a report to a TX UE identifying available and/or unavailable resources. In some aspects, the UE can transmit the report using any suitable technique or combination of techniques. For example, the UE can transmit the report using techniques described above in connection with 522 of FIG. 5.

Figure 10:
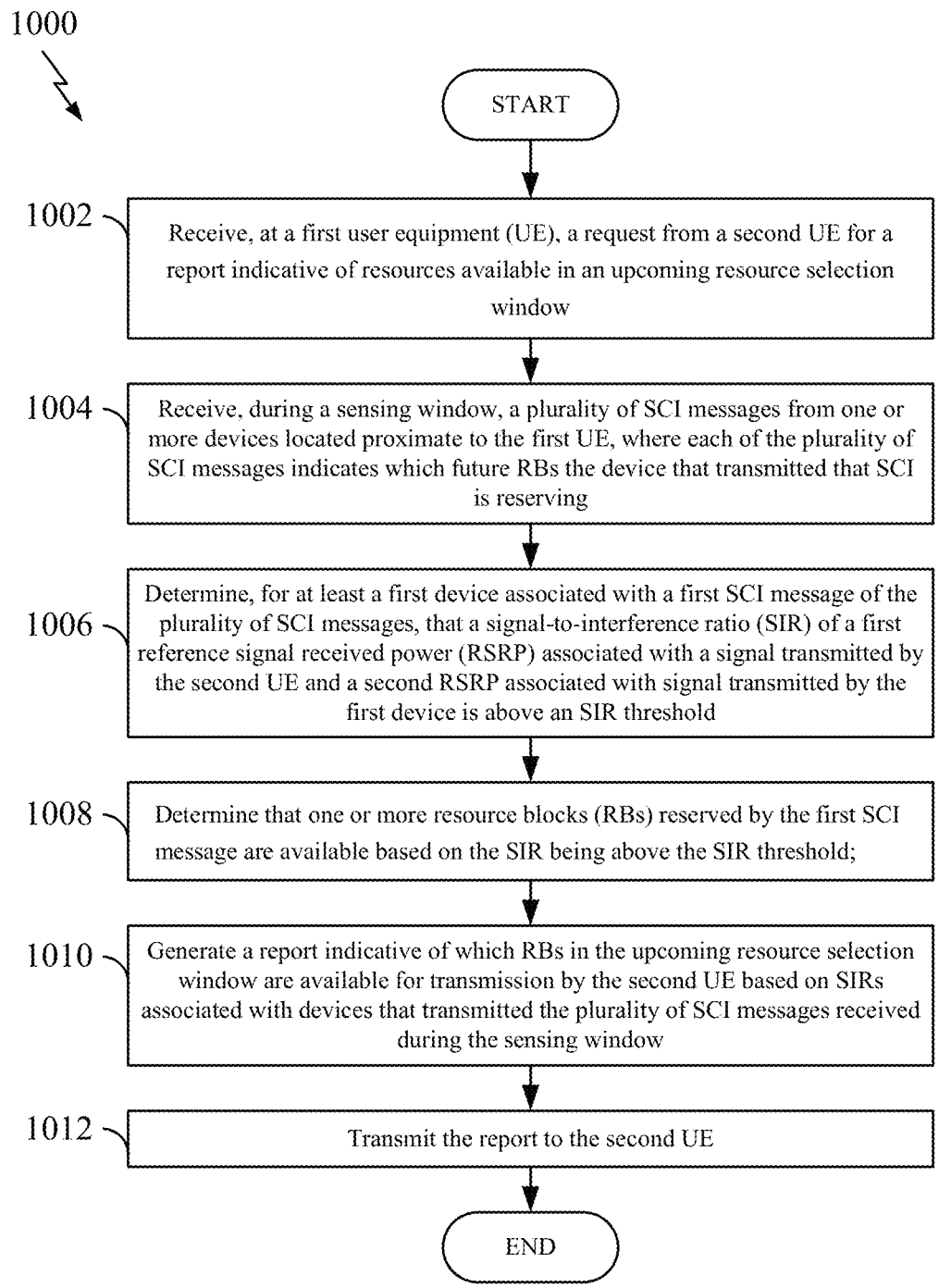
FIG. 10 is a flow chart illustrating an exemplary process for sidelink resource reservation according to some aspects of the disclosed subject matter.

FIG. 10 is a flow chart illustrating an exemplary process 1000 for sidelink resource allocation in accordance with some aspects of the present disclosure. As described below, some or all illustrated features may be omitted in a particular implementation within the scope of the present disclosure, and some illustrated features may not be required for implementation of all features. In some examples, the process 1000 may be carried out by a UE or scheduled entity as illustrated in any one of FIGS. 1, 2, 4, 5, and/or 6. In some examples, the process 1000 may be carried out by any suitable apparatus or means for carrying out the functions or algorithm described below.

At block 1002, a UE (e.g., a first UE) may receive a request from a second UE for a report indicative of resources available in an upcoming resource selection window. For example, a transceiver 410 in a UE 400 may receive a message (e.g., an SCI on a sidelink channel, or any other suitable message format on any other suitable channel) including information indicating the available resources in the resource selection window, as described above.

At block 1004, the first UE may receive, during a sensing window, a plurality of SCI messages from one or more devices located proximate to the first UE, wherein each of the plurality of SCI messages indicates which future resources the device that transmitted that SCI is reserving. For example, the transceiver 410 of the UE 400 may further receive SCI messages including information indicating a sidelink resource availability, sidelink resource reservations, or other suitable information indicating reserved future resources, as described above.

At block 1006, the first UE may determine, for at least a first device associated with a first SCI message of the plurality of SCI messages, that a signal-to-interference ratio (SIR) of a first reference signal received power (RSRP) associated with a signal transmitted by the second UE and a second RSRP associated with signal transmitted by the first device is above an SIR threshold. For example, an SIR estimation circuit 404 in a UE 400 may operate in conjunction with an adaptive RSRP threshold circuit 442 to generate an SIR estimate based on any suitable measurements, as described above. The SIR estimation circuit 440 may further compare the SIR estimate to information such as resource availability information in a received and/or generated report, one or more SIR thresholds, or other suitable information as described above.

At block 1008, the first UE may determine that resources reserved by the first SCI message are available based on the SIR being above the SIR threshold. For example, an adaptive RSRP threshold circuit 442 in a UE 400 may refer to SCI message information stored in memory 405, and identify reserved resources corresponding to resources above the given threshold, as described above.

At block 1010, the first UE may generate a report indicative of which resources in the upcoming resource selection window are available for transmission by the second UE based on SIRs associated with devices that transmitted the plurality of SCI messages received during the sensing window. For example, the processor 404 (e.g., the adaptive RSRP threshold circuit 442) may generate a resource availability report as described above and store the generated report in memory 405.

At block 1012, the first UE may transmit the report to the second UE. For example, the UE 400 may employ the transceiver 410 to transmit the report over a sidelink carrier or channel utilizing the available resources.

The following simulation results represent a particular simulated implementation of techniques described herein, and are not intended to be limiting or represent a prediction of how effective techniques described herein are likely to be in practice.

Various resource allocation techniques described above were simulated, and results of various simulations are described below. In the simulations, each TX UE was associated with a single unique RX UE, which generated RA reports for techniques that included monitoring by an RX UE. In the simulations, RF-distance was used to evaluate the reliability of a link between a TX UE and an associated RX UE. RF-distance in the simulations is the sum of pathloss and shadow fading values for the link between any TX-UE and the associated RX-UE. In the simulations, RA reports were assumed to be immediately available with no latency to avoid overcomplicating the simulations.

In the tables below, RL-X (e.g., RL-99, RL-95) represents a reliability level-X. For a given RL-X, the average RF-distance at which packet decoding reliability falls below a pre-defined value represents performance of the technique. For example, for RL-99, the simulation was used to determine an average RF distance at which 1 out of every 100 packet was not decoded by the RX UE. Accordingly, a higher RF-distance corresponds to better performance. Alternatively, if the RF-distance were held constant, the TX UE could use less power to achieve a target reliability.

The following parameters were used in the simulations: inter-site distance (ISD); $N_{TX}$; $T_{rep}$; and $N_{RB}$. ISD represents a distance between two adjacent site centers, and can be used to control a density of UEs in a given area in the simulation, and $N_{TX}$ represent the average number of TX UEs per site. Accordingly, if ISD is decreased while holding $N_{TX}$ constant, the density of UEs generally increases, which can simulate a higher network load.

$T_{rep}$ represents the average inter-packet generation time for each TX UE, and $N_{RB}$ represents the packet (or transport block, TB) size in number of RBs used on PSSCH. In the simulations described below, $N_{TX}$ and $T_{rep}$ were fixed at $N_{TX}$=252 UEs per site, and $T_{rep}$=100 ms.

TABLE 1 includes simulation results for a simulated heavily loaded network with ISD=200 meters and $N_{RB}$=50 RBs/TB. RX-only sensing performed about 8 dB better than TX-only sensing for RL-99, 9 dBs better for RL-95, and 6 dBs for RL-90. Applications that may benefit from higher reliability gain more from the RX-only technique. This can potentially be attributed to TX-only and AND-combining identifying many more resources as unavailable that are available when the RSRP at the RX-UE is measured. RX-only sensing performed better overall reliability levels in this simulation. In TABLE 1, RX-only2 is a technique in which only information monitored by the RX UE is used, and an adaptive RSRP threshold/SIR threshold was also used.

TABLE 1

|  | RL-99 | RL-95 | RL-90 | No. of Links with RL-99 |
| --- | --- | --- | --- | --- |
| TX-only | 95.9 dB | 102.8 dB | 107.1 dB | 33 |
| RX-only | 103.8 dB | 111.5 dB | 113.0 dB | 76 |
| RX-only2 | 105.2 dB | 112.2 dB | 113.1 dB | 101 |

Figure 11:
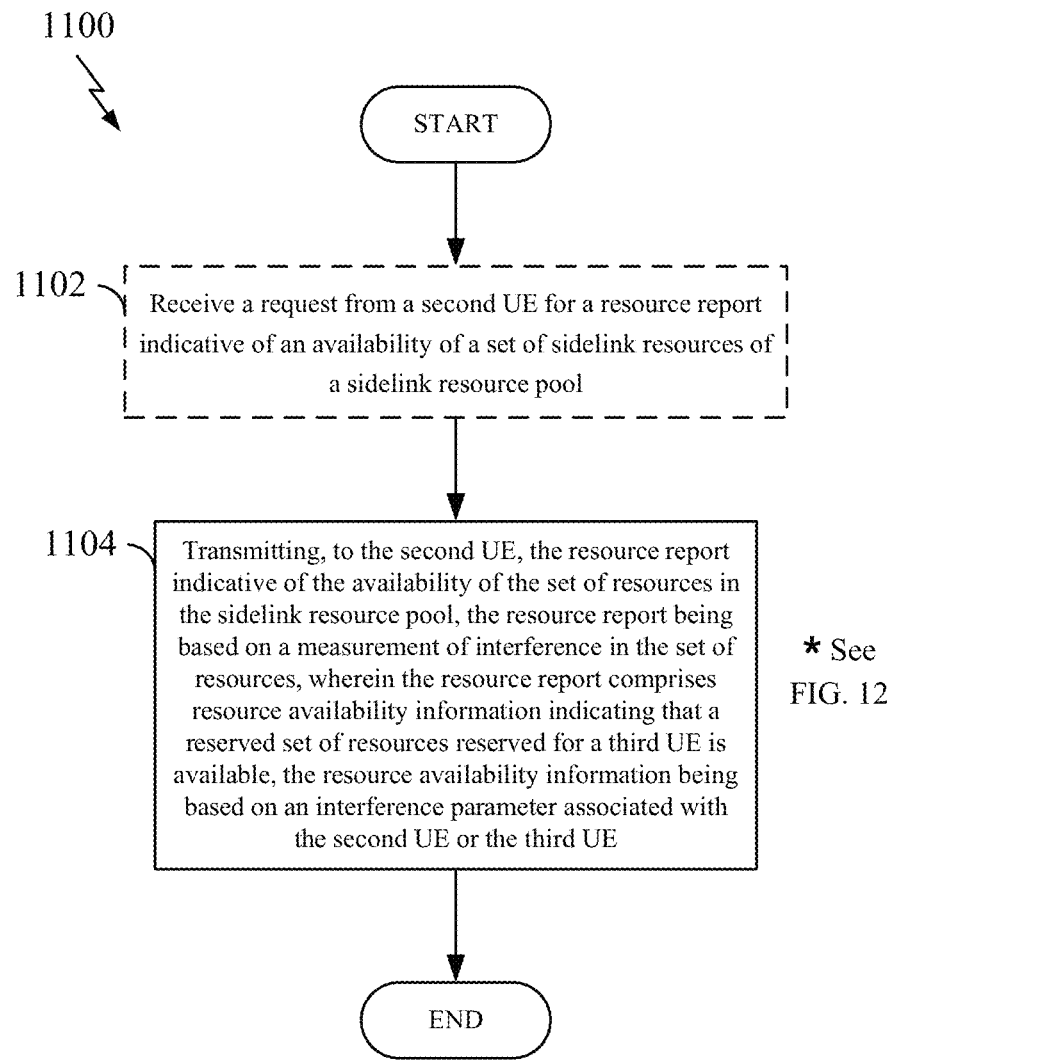
FIG. 11 is a flow chart illustrating an exemplary process for a UE to transmit a resource report indicating which resources are available and/or unavailable by a transmitting UE in accordance with some aspects of the disclosed subject matter.

FIG. 11 is a flow chart illustrating an exemplary process 1100 for a user equipment (UE) to transmit a resource report indicating which resources are available and/or unavailable by a transmitting UE in accordance with some aspects of the disclosed subject matter. As described below, some or all illustrated features may be omitted in a particular implementation within the scope of the present disclosure, and some illustrated features may not be required for implementation of all features. In some examples, the process 1100 may be carried out by a UE or scheduled entity as illustrated in any of FIGS. 1, 2, 4, 5, 6, and/or 7. In some examples, the process 1100 may be carried out by any suitable apparatus or means for carrying out the functions or algorithm described below.

At block 1102, a first UE (e.g., RX UE or UE A 502, 602 of FIGS. 5 and/or 6) may, for example, receive a request from a second UE (e.g., TX UE or UE B 504, 604 of FIGS. 5 and/or 6) for a resource report indicative of an availability of a set of resources. For example, the second UE as a transmitting UE may transmit a packet on one or more available resources of the set of resources. Here, in some examples, a set of sidelink resources may, for example, include one or more sidelink resources in the sidelink resource pool. In some aspects, a packet to be transmitted may include control information (e.g., sidelink control information (SCI) or any other suitable control information) and/or data (e.g., sidelink user data or any other suitable data). For the transmission of the packet, the second UE may, for example, select the one or more available resources among the set of resources based on the resource report from the first UE to increase transmission reliability. In some examples, the first UE may receive the request from the second UE for the resource report. The request for the resource report may include any suitable information (e.g., a priority associated with a transmission, a modulation and coding scheme (MCS) associated with the transmission, a request to use a signal strength threshold or an adaptive threshold) as explained at 512 of FIG. 5 and 616 of FIG. 6. In some examples, the first UE may receive the request using resources (e.g., PSCCH and/or PSSCH) as explained at 518 of FIG. 5. Examples of the resource may include a resource block, a subcarrier, a frequency spectrum (channel or carrier), a time slot or subframe of a TDD/FDD component carrier, a spreading code, a precoder, and/or other resources commonly used for sidelink communication. In some examples, the first UE may determine or generate the resource report indicative of an availability of a set of resources in a sidelink resource pool based on a measurement of interference in the set of resources. In further examples, the resource report may include resource availability information indicating that a reserved set of resources reserved for a third UE is available based on an interference parameter for the reserved set associated with the second UE or the third UE.

At block 1104, the first UE may, for example, transmit the resource report based on a measurement of interference in the set of resources. In some examples, the first UE may include a transceiver coupled with a processor, and the transceiver is configured to transmit the resource report to the second UE. In other examples, the first UE may include an interface coupled with a processor, and the interface is configured to output the resource report for the second UE. The interface may, for example, a bus interface. In some cases, the first UE might not actually transmit the resource report. But the first UE may have an interface to output the resource report for transmission (a means for outputting) to the second UE. For example, a processor may output the resource report, via a bus interface, to a radio frequency (RF) front end for transmission.

In some scenarios, the measurement of interference in the set of resources may be based on a signal strength of a signal (e.g., control information) from one or more interfering UEs (e.g., the third UE) and/or a signal strength of a signal (e.g., a reference signal) from the second UE. In some examples, the first UE may transmit the resource report in response to the explicit request from the second UE. However, it should be appreciated that this is a mere example to transmit the resource report. For example, the first UE may transmit the resource report without the explicit request from the second UE. In some scenarios, the first UE may transmit the resource report after a predetermined period of time expires. Also, the first UE may periodically transmit the resource report. For example, the first UE can be configured to transmit a report every N slots (e.g., every 8 slots). In other scenarios, the first UE may identify one or more collisions of transmissions from the second UE, and transmit the resource report in response to the identified one or more collisions. In some examples, the one or more collisions may include multiple consecutive collisions of transmissions from the second UE. The transmissions may include transmissions of a packet, control information, or any other suitable signal to the first UE or any other suitable device. In some examples, the transmissions by the second UE may collide with its own simultaneous transmission of other packet or reception of other message (e.g., an SCI message from the third UE). The first UE may identify the one or more collisions by receiving a message from the first UE or measuring an interference.

In some aspects, the resource report may indicate an availability of the set of resources among a sidelink resource pool based on reserved resources reserved by one or more other interfering UEs. The resource report may include resource availability information indicating that a reserved resource reserved for a third UE is available. The availability information may be determined based on an interference parameter associated with the second UE or the third UE. Thus, the availability information may indicate, in some examples, that a reserved resource reserved by an interfering UE (e.g., the third UE) is available for the second UE to transmit a packet on the reserved resource. In some examples, the interference parameter may include a signal-to-interference ratio (SIR) between a link corresponding to the first UE and another link corresponding to the third UE and/or an adaptive RSRP threshold. The measurement of interference may include a measurement of a signal strength of a signal from an interfering UE (e.g., a third UE). Determining the availability and configuring the resource report based on the interference parameter are further described in connection with FIG. 12.

Figure 12:
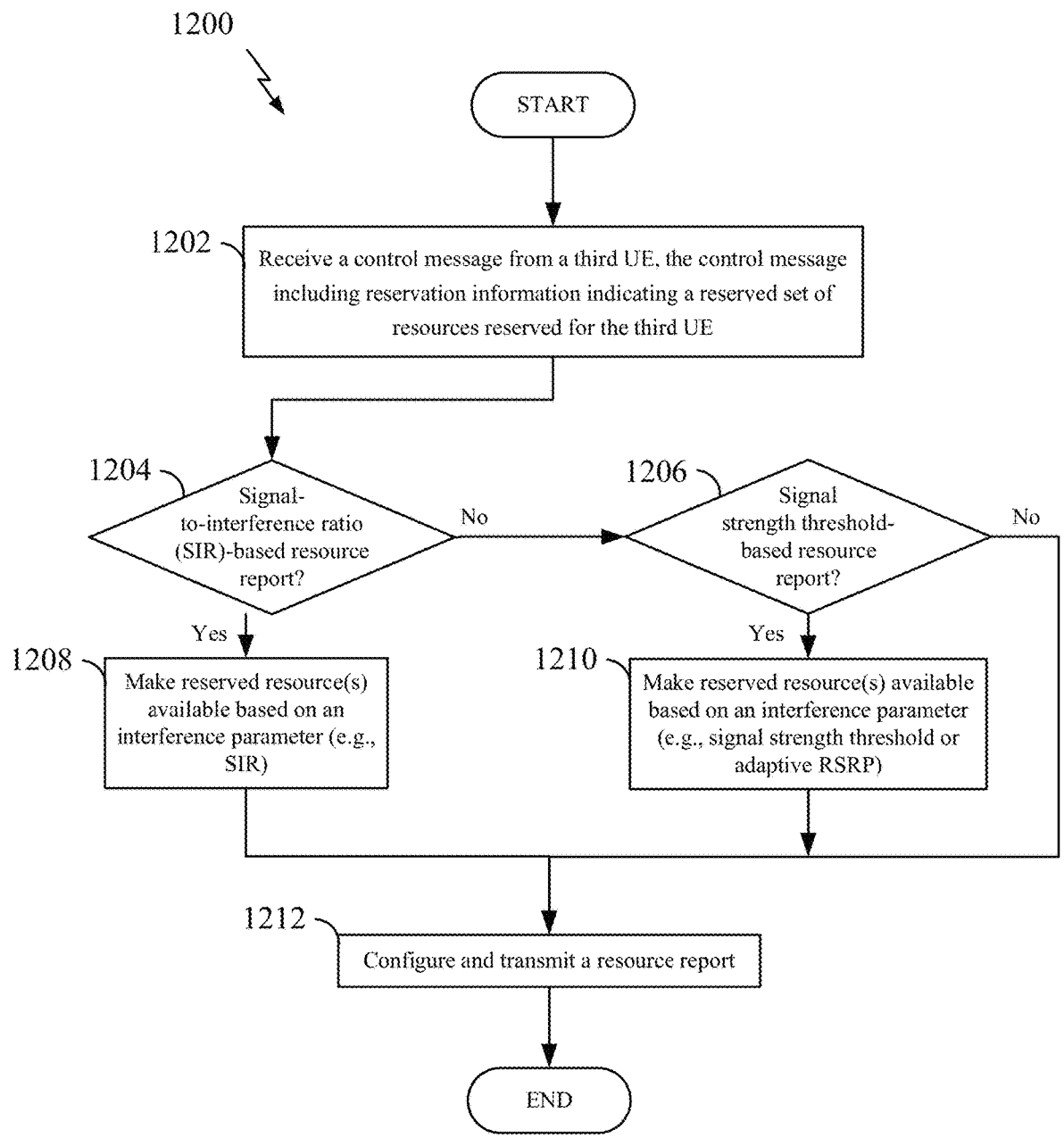
FIG. 12 is a flow chart illustrating an exemplary process for a UE to configure and transmit a resource report indicating which resources are available and/or unavailable by a transmitting UE in accordance with some aspects of the disclosed subject matter.

FIG. 12 is a flow chart illustrating an exemplary process 1200 for a user equipment (UE) to configure and transmit a resource report indicating which resources are available and/or unavailable by a transmitting UE in accordance with some aspects of the disclosed subject matter. As described below, some or all illustrated features may be omitted in a particular implementation within the scope of the present disclosure, and some illustrated features may not be required for implementation of all features. In some examples, the process 1200 may be carried out by a UE or scheduled entity as illustrated in any of FIGS. 1, 2, 4, 5, 6, and/or 7. In some examples, the process 1200 may be carried out by any suitable apparatus or means for carrying out the functions or algorithm described below.

At block 1202, the first UE may receive a control message (e.g., sidelink control information (SCI)) from the third UE in a resource sensing window. In some examples, the control message may include resource reservation information identifying a reserved set of resources reserved for the third UE in a resource selection window. In some aspects, the first UE may monitor the resource sensing window to receive the control message. The control message received in the resource sensing window may include a reservation for one or more resources in the resource selection corresponding to the resource sensing window. In some examples, a gap may exist between the resource sensing window and the earliest time in the resource selection window that the second UE may select for transmission for a packet. In further examples, a measurement interference in the set of resources to determine the resource report may correspond to a measurement of a signal strength of the control message from the third UE. In some instances, the signal strength may be a reference signal received power (RSRP), a reference signal received quality (RSRQ), or any other suitable measurement of the signal level.

When the first UE may neither use a signal-to-interference ratio ("NO" at block 1204) nor use a signal strength threshold (e.g., an adaptive threshold) ("NO" at block 1206), at block 1212, the first UE may configure and transmit the resource report based on the control message from the third UE. In some examples, the first UE may use a fixed threshold to determine which resources are available and/or unavailable in the resource selection window. For example, when an RSRP for a reserved resource of the resources is equal to or less than a fixed threshold, the first UE may determine that the reserved resource is available because the interference on the reserved resource by the third UE might not severely affect reliable communication on the link from the second UE to the first UE. On the other hand, when an RSRP of a reserved resource of the resources is greater than a fixed threshold, the first UE may determine that the reserved resource is not available. The first UE may also determine that not-reserved resources in the resource selection window are available. Based on the determined available and unavailable resources, the first UE may configure the resource report to indicate an availability of the set of resources. The first UE may, then, transmit the resource report to the second UE. This process is described above in connection with FIG. 8.

In some examples, the first UE may further use a signal-to-interference ratio (SIR) to determine resource availability ("YES" at block 1204). In some examples, at block 1208, based on an SIR of a reserved resource, the first UE may determine that the reserved resource by the third UE is available. For example, the first UE identifies the reserved set reserved for the third UE at block 1202, and the first UE may further receive a reference signal from the second UE in the resource sensing window. In some examples, the reference signal may include a demodulation reference signal (DMRS), a phase-tracking reference signal (PT-RS), a sounding reference signal (SRS), a channel state information reference signal (CSI-RS) or any other suitable reference signal for measuring a target signal strength (e.g., RSRP or RSRQ). In some examples, the first UE may receive the reference signal within a control message or any other suitable message using PDCCH or PSSCH. The first UE may determine that a reserved set of resources reserved for the third UE is available, when a interference parameter corresponding to the reference signal from the second UE, and the control message from the third UE, is equal to or greater than an SIR threshold. In some examples, the interference parameter may include an SIR. In some examples, the first UE may determine the SIR of the reserved set of resources between a first link between the second UE and the first UE and a second link between the third UE and the first UE. Thus, the SIR may be calculated based on a ratio of the signal strength of the control message from the third UE and a signal strength of the reference signal from the second UE. The signal strength may include an RSRP, an RSRQ, or any other suitable signal level. In some examples, the signal strength includes an RSRP (dBm), the ratio of the signal strength of the control message from the third UE and a signal strength of the reference signal from the second UE may be the difference in the log domain between the signal strength of the control message from the third UE and a signal strength of the reference signal.

For example, the first UE may measure a target signal strength of the first link (e.g., $RSRP_{second\ UE \to first\ UE}$=−90 dBm) and an interference signal strength of the second link (e.g., $RSRP_{third\ UE \to first\ UE}$=−102 dBm). Then, the first UE may estimate an SIR based on the ratio of the first and second links as to 12 dB. For example, the first UE may estimate an SIR by subtracting the RSRP of the second link in the log domain from the RSRP of the first link in the log domain (−90 dBm−(−102 dBm)=12 dB). When an SIR threshold is 10 dB, the first UE may determine that the reserved set of resources reserved by the third UE is available because the SIR (12 dB) is not less than the SIR threshold (10 dB). On the other hand, when the SIR is less than the SIR threshold, the first UE may determine that the reserved set of resources reserved by the third UE is unavailable. It should be appreciated that the target and/or interference signal strengths are not limited to the RSRP. In some examples, the target and/or interference signal strengths may be the RSRQ or any other suitable signal level. In some examples, RSRQ may replace the RSRP with similar utilization with higher reliability in estimating the desired signal power. For example, if $RSRQ_{second\ UE \to first\ UE}$=−10 dB and $RSRQ_{third\ UE \to first\ UE}$=−22 dB as some measured example values, then the first UE may decide that the corresponding resource is available based on the SIR for the resource. In some instances, when the SIR for the resource under consideration is 12 dB and the predetermined threshold is 10 dB, the first UE may determine the resource is available because the SIR (12 dB) is higher than the predetermined threshold (10 dB). Also, it should be understood that the SIR threshold (10 dB) is a mere example. The first UE may determine any other suitable SIR threshold.

In some examples, the first UE may determine the SIR threshold based on a priority associated with one or more packets to be transmitted by the second UE. For example, the first use may receive, from the second UE, priority information indicative of the priority associated with the one or more packets. In some examples, the priority may indicate a communication capacity (a number of available resources) for the transmission. For example, when a packet to be transmitted by the second UE has a high priority, the first UE may set a low SIR threshold. Thus, the first UE may make more reserved resources available for transmission of the packet than a high SIR threshold. In other examples, the priority may indicate a transmission reliability level (a successful transmission rate of a packet). For example, when a packet to be transmitted by the second UE has a high priority, the first UE may set a high SIR threshold. Thus, the first UE may make less reserved resources with less interference by other UEs available for the transmission of the packet than a low SIR threshold. Thus, the first UE may perform a more reliable transmission having a less decoding failure rate for the packet than a low SIR threshold.

In other examples, the first UE may determine the SIR threshold by receiving, from the second UE, data rate information indicative of a modulation and coding scheme (MCS) associated with one or more packets to be transmitted by the second UE. For example, when a packet to be transmitted by the second UE has a high modulation order (e.g., 256 QAM, 512 QAM), the first UE may set a high SIR threshold. That is, a single RE of the resources may carry more bits with a high modulation order than a lower modulation order. Thus, the first UE may make less reserved resources with less interference by other UEs available for transmission of the packet than a low SIR threshold. In other examples, when a packet to be transmitted by the second UE has a low code rate, the first UE may set a low SIR threshold. Since a low code rate corresponding to increased redundancy of bits to be transmitted may decrease the bit error rate, the first UE may increase communication capacity by making more reserved resources available by setting the low SIR threshold. It should be appreciated that that the priority and/or the MCS are mere examples to determine the SIR threshold. The SIR threshold may be any other suitable SIR threshold to determine a resource availability of the reserved set based on an SIR.

At block 1212, the first UE may configure and transmit the resource report based on the SIR of the reserved set of resources in the resource selection window. The first UE may configure the resource report to include resource availability information indicating that the reserved set of resources reserved for the third UE is available, when an SIR corresponding to the reference signal from the second UE, and the control message from the third UE is not less than an SIR threshold. In some examples, the first UE may configure the resource report to include resource availability information that one or more not-reserved resources in the resource selection window are available. In further examples, when another SIR corresponding to the reference signal from the second UE and the control message from the third UE for a different reserved set of resources is less than an SIR threshold, the first UE may configure the resource report to include information that the different reserved set of resources is unavailable. Based on the configured resource report indicating an availability of the set of resources in the resource selection window, the first UE may, then, transmit the resource report to the second UE. This process is described above in connection with FIG. 9.

In other examples, the first UE may not use an SIR to determine resource availability ("NO" at block 1204), but use a signal strength threshold (e.g., adaptive threshold) ("YES" at block 1206) to determine resource availability. In some aspects, at block 1210, based on a signal strength threshold for a reserved resource, the first UE may make the reserved resource by the third UE available. For example, the first UE identifies the reserved set reserved for the third UE at block 1202, and the first UE may further receive a reference signal from the second UE during a resource sensing window. The first UE may calculate the interference parameter (e.g., adaptive signal strength threshold) based on a comparison between a signal strength of the reference signal from the second UE and an SIR threshold. The interference parameter may be referred to as an RSRP adaptive threshold. For example, the interference parameter may be indirectly calculated such that the SIR threshold is the signal strength threshold subtracted from the signal strength of the reference signal from the second UE ($SIR_{threshold} = RSRP_{B \to A} - RSRP_{threshold}$ or $RSRP_{threshold} = RSRP_{B \to A} - SIR_{threshold}$). That is, $$10\log \frac{RSRP_{B \to A}}{RSRP_{threshold}} (SIR_{threshold}) =$$
$$10\log 10^{\frac{RSRP_{B \to A}}{10}} (RSRP_{B \to A}) - 10\log 10^{\frac{RSRP_{threshold}}{10}} (RSRP_{threshold}).$$

In further examples, an SIR threshold may correspond to having different RSRP levels for each resource under consideration. For example, $RSRP_{threshold}(m) = RSRP_{B \to A}(m) - SIR_{threshold}$, where m is the resource under consideration. In some examples, when the signal strength of the control message from the third UE for the reserved set of resources is equal to or less than the signal strength threshold ($RSRP_{C \to A} \le RSRP_{threshold}$), the first UE may determine the reserved set of resources reserved for the third UE is available. In some scenarios, the first UE may determine the SIR threshold based on a priority and/or an MCS associated with one or more packets to be transmitted by the second UE as explained above at block 1208. This process is described above in connection with FIG. 10.

In some examples, this signal strength threshold-based procedure to determine a resource availability of a reserved resource of the resources may be similar to the SIR-based procedure. For example, since $RSRP_{threshold}$ is $RSRP_{B \to A} - SIR_{threshold}$, the signal strength of the control message from the third UE for the reserved set of resources being equal to or less than the signal strength threshold may be given by: $RSRP_{C \to A} \le RSRP_{B \to A} - SIR_{threshold}$. This can be also given by: $SIR_{threshold} \le RSRP_{B \to A} - RSRP_{C \to A}$. Since $RSRP_{B \to A} - RSRP_{C \to A}$ is the SIR calculated based on the difference, in decibels, between the signal strength of the control message from the third UE ($RSRP_{C \to A}$) and the signal strength of the reference signal from the second UE ($RSRP_{B \to A}$), this can be given by: $SIR_{threshold} \le SIR$ (second UE, third UE) that is used for determining a resource availability based on an SIR at block 1208.

In further examples, the first UE may determine a reserved resource reserved by multiple interfering UEs is available when an aggregate of measurements of signal strengths of multiple control messages (e.g., SCI messages) from the multiple interfering UEs is equal to or less than the signal strength threshold (e.g., the adaptive threshold). For example, the first UE my receive multiple control messages (e.g., SCI messages) from multiple UEs. Each control message may, for example, include resource reservation information identifying the reserved set of resources reserved for the multiple UEs. That is, the multiple UEs may reserve the same resource(s) in the resource selection window. In some examples, the first UE may calculate an aggregate of measurements of signal strengths of the multiple control messages from the multiple UEs. Thus, the first UE may aggregate a measurement of a signal strength of a control message from each interfering UE. In some instances, the measurement of interference in the set of resource to be based on the resource report may correspond to an aggregate of measurements of signal strengths of the multiple control messages from the multiple UEs. For example, the first UE may sum the RSRPs of control messages from N UEs (e.g., an aggregate of measurements of signal strengths from N UEs=$\Sigma_{i=1}^{N} RSRP_{UE_i \to first\ UE}$). Then, the first UE may determine when the aggregate of signal strengths for the reserved set of resources is equal to or less than the signal strength threshold ($\Sigma_{i=1}^{N} RSRP_{UE_i \to first\ UE} \le RSRP_{threshold}$), the first UE may determine that the reserved set of resources reserved for the third UE is available. It should be appreciated that the signal strength and the aggregate of measurements of signal strengths are not limited to an RSRP. In some examples, the signal strength and aggregate of measurements of signal strengths may be an RSRQ for the reserved set of resources, or any other suitable measurement of a sidelink signal strength or level.

At block 1212, the first UE may configure and transmit the resource report based on the interference parameter (e.g., signal strength threshold) of the reserved set of resources in the resource selection window. In some examples, the first UE may configure the resource report to include resource availability information indicating that the reserved set of resources reserved for the third UE is available in response to the signal strength of the control message from the third UE being equal to or less than a signal strength threshold (e.g., an adaptive threshold). In other examples, the first UE may configure the resource report to include resource availability information indicating that the reserved set of resources reserved for multiple UEs is available, when the aggregate of measurements of signal strength of multiple control messages from the multiple UEs is equal to or less than a signal strength threshold. In other examples, the first UE may configure the resource report to include resource availability information that one or more not-reserved resources are available. In further examples, when another signal strength of another control message from the third UE for a different reserved set of resources or another aggregate of measurements of signal strengths of multiple control messages from the multiple UEs for the different reserved set is greater than a signal strength threshold, the first UE may configure the resource report to include resource availability information that the different reserved set of resources is unavailable. Based on the configured resource report indicating an availability of the set of resources in the resource selection window, the first UE may, then, transmit the resource report to the second UE. This process is described above in connection with FIG. 10.

Further Aspects Having a Variety of Features:

Example 1. A method, apparatus, and non-transitory computer-readable medium for wireless communication operable at a first user equipment (UE), the method comprising: transmitting, to a second UE, a resource report indicative of an availability of a set of resources among a sidelink resource pool, the resource report being based on a measurement of interference in the set of resources, the resource report comprising resource availability information indicating that a reserved set of resources reserved for a third UE is available, the resource availability information being based on an interference parameter associated with the second UE or the third UE.

Example 2. The method, apparatus, and non-transitory computer-readable medium of Example 1, further comprising: receiving a request from the second UE for the resource report, wherein the transmitting the resource report is in response to the request.

Example 3. The method, apparatus, and non-transitory computer-readable medium of any of Examples 1 to 2, wherein the resource report is transmitted after a predetermined period of time expires.

Example 4. The method, apparatus, and non-transitory computer-readable medium of any of Examples 1 to 3, further comprising: identifying one or more collisions of transmissions from the second UE,
wherein the resource report is transmitted in response to the identified one or more collisions.

Example 5. The method, apparatus, and non-transitory computer-readable medium of any of Examples 1 to 4, wherein the one or more collisions include multiple consecutive collisions of transmissions by the second UE.

Example 6. The method, apparatus, and non-transitory computer-readable medium of any of Examples 1 to 5, further comprising: receiving a control message from the third UE, the control message comprising resource reservation information identifying the reserved set of resources reserved for the third UE, wherein the measurement of interference corresponds to a measurement of a signal strength of the control message from the third UE.

Example 7. The method, apparatus, and non-transitory computer-readable medium of any of Examples 1 to 6, further comprising: receiving a reference signal from the second UE, wherein the interference parameter corresponds to the reference signal from the second UE and the control message from the third UE, wherein the interference parameter comprises a signal-to-interference ratio (SIR), and wherein the resource availability information of the resource report further indicates that the reserved set of resources reserved for the third UE is available in response to the SIR of the interference parameter being equal to or greater than an SIR threshold.

Example 8. The method, apparatus, and non-transitory computer-readable medium of any of Examples 1 to 7, wherein the interference parameter is calculated based on a ratio between the signal strength of the control message from the third UE and a signal strength of the reference signal from the second UE.

Example 9. The method, apparatus, and non-transitory computer-readable medium of any of Examples 1 to 8, wherein the resource availability information indicates that the reserved set of resources reserved for the third UE is available in response to the signal strength of the control message from the third UE being equal to or less than the interference parameter.

Example 10. The method, apparatus, and non-transitory computer-readable medium of any of Examples 1 to 9, further comprising: receiving a reference signal from the second UE, wherein the interference parameter is calculated based on a comparison between a signal strength of the reference signal from the second UE and an SIR threshold.

Example 11. The method, apparatus, and non-transitory computer-readable medium of any of Examples 1 to 10, further comprising: receiving, from the second UE, priority information indicative of a priority associated with one or more packets to be transmitted by the second UE; and determining the SIR threshold based on the priority associated with the one or more packets.

Example 12. The method, apparatus, and non-transitory computer-readable medium of any of Examples 1 to 11, further comprising: receiving, from the second UE, data rate information indicative of a modulation and coding scheme (MCS) associated with one or more packets to be transmitted by the second UE; and determining the SIR threshold based on the MCS associated with the one or more packets.

Example 13. The method, apparatus, and non-transitory computer-readable medium of any of Examples 1 to 12, further comprising: receiving a plurality of control messages from a plurality of UEs including the third UE, each of the plurality of control messages comprising resource reservation information identifying the reserved set of resources reserved for each of the plurality of UEs, wherein the measurement of interference corresponds to an aggregate of measurements of signal strengths of the plurality of control messages from the plurality of UEs, and wherein the resource available information indicates that the reserved set of resources reserved for the plurality of UEs is available in response to the aggregate of measurements of signal strengths being equal to or less than the interference parameter.

Example 13A. The apparatus operable at the first UE of any of Examples 1 to 13, further comprising: a processor, a transceiver communicatively coupled to the processor, and a memory communicatively coupled to the processor, wherein the processor and the memory are configured to: determine a resource report indicative of an availability of a set of resources in a sidelink resource pool, the resource report being based on a measurement of interference in the set of resources, wherein the resource report comprises resource availability information indicating that a reserved set of resources reserved for a third UE is available, the resource availability information being based on an interference parameter for the reserved set associated with a second UE or the third UE, wherein the transceiver communicatively coupled to the processor is configured to: transmit the resource report to the second UE.

Example 13B. The apparatus operable at the first UE of any of Examples 1 to 13, further comprising: a processor, an interface communicatively coupled to the processor, and a memory communicatively coupled to the processor, wherein the processor and the memory are configured to: determine a resource report indicative of an availability of a set of resources in a sidelink resource pool, the resource report being based on a measurement of interference in the set of resources, wherein the resource report comprises resource availability information indicating that a reserved set of resources reserved for a third UE is available, the resource availability information being based on an interference parameter for the reserved set associated with a second UE or the third UE, wherein the interface communicatively coupled to the processor is configured to: output the resource report for the second UE.

Example 14. A first user equipment (UE) for wireless communication, comprising: means for generating a resource report, for a second UE, indicative of an availability of a set of resources among a sidelink resource pool, the resource report being based on a measurement of interference in the set of resources, the resource report comprising resource availability information indicating that a reserved set of resources reserved for a third UE is available, the resource availability information being based on an interference parameter associated with the second UE or the third UE; and means for transmit, to a second UE, the resource report.

Example 15. The first UE of Example 14, further comprising: means for receiving a request from the second UE for the resource report, wherein the transmitting the resource report is in response to the request.

Example 16. The first UE of any of Examples 14 to 15, wherein the resource report is transmitted after a predetermined period of time expires.

Example 17. The first UE of any of Examples 14 to 16, further comprising: means for identifying one or more collisions of transmissions from the second UE, wherein the resource report is transmitted in response to the identified one or more collisions.

Example 18. The first UE of any of Examples 14 to 17, wherein the one or more collisions include multiple consecutive collisions of transmissions by the second UE.

Example 19. The first UE of any of Examples 14 to 18, further comprising: means for receiving a control message from the third UE, the control message comprising resource reservation information identifying the reserved set of resources reserved for the third UE, wherein the measurement of interference corresponds to a measurement of a signal strength of the control message from the third UE.

Example 20. The first UE of any of Examples 14 to 19, further comprising: means for receiving a reference signal from the second UE, wherein the interference parameter corresponds to the reference signal from the second UE and the control message from the third UE, wherein the interference parameter comprises a signal-to-interference ratio (SIR), and wherein the resource availability information of the resource report further indicates that the reserved set of resources reserved for the third UE is available in response to the SIR of the interference parameter being equal to or greater than an SIR threshold.

Example 21. The first UE of any of Examples 14 to 20, wherein the interference parameter is calculated based on a ratio between the signal strength of the control message from the third UE and a signal strength of the reference signal from the second UE.

Example 22. The first UE of any of Examples 14 to 21, wherein the resource availability information indicates that the reserved set of resources reserved for the third UE is available in response to the signal strength of the control message from the third UE being equal to or less than the interference parameter.

Example 23. The first UE of any of Examples 14 to 22, further comprising: means for receiving a reference signal from the second UE, wherein the interference parameter is calculated based on a comparison between a signal strength of the reference signal from the second UE and an SIR threshold.

Example 24. The first UE of any of Examples 14 to 23, further comprising: means for receiving, from the second UE, priority information indicative of a priority associated with one or more packets to be transmitted by the second UE; and means for determining the SIR threshold based on the priority associated with the one or more packets.

Example 25. The first UE of any of Examples 14 to 24, further comprising: means for receiving, from the second UE, data rate information indicative of a modulation and coding scheme (MCS) associated with one or more packets to be transmitted by the second UE; and means for determining the SIR threshold based on the MCS associated with the one or more packets.

Example 26. The first UE of any of Examples 14 to 25, further comprising: means for receiving a plurality of control messages from a plurality of UEs including the third UE, each of the plurality of control messages comprising resource reservation information identifying the reserved set of resources reserved for each of the plurality of UEs, wherein the measurement of interference corresponds to an aggregate of measurements of signal strengths of the plurality of control messages from the plurality of UEs, and wherein the resource available information indicates that the reserved set of resources reserved for the plurality of UEs is available in response to the aggregate of measurements of signal strengths being equal to or less than the interference parameter.

Example 27: A method of wireless communication, comprising: receiving, during a sensing window, a plurality of SCI messages from one or more devices located proximate to the first UE, wherein each of the plurality of SCI messages indicates which future resources the device that transmitted that SCI is reserving; determining, for at least a first device associated with a first SCI message of the plurality of SCI messages, that a signal-to-interference ratio (SIR) of a first reference signal received power (RSRP) associated with a signal transmitted by the second UE and a second RSRP associated with signal transmitted by the first device is above an SIR threshold; determining that resources reserved by the first SCI message are available based on the SIR being above the SIR threshold; generating a report indicative of which resources in the upcoming resource selection window are available for transmission by the second UE based on SIRs associated with devices that transmitted the plurality of SCI messages received during the sensing window; and transmitting the report to the second UE.

Example 28: The method of wireless of communication of Example 27, wherein determining that the SIR of the first RSRP and the second RSRP associated is above the SIR threshold comprises: determining the first RSRP based on the signal transmitted by the second UE; determining the second RSRP based on the signal transmitted by the first device; determining the SIR based on a comparison of the first RSRP to the second RSRP; and determining that the SIR is above the SIR threshold.

Example 29: The method of wireless of communication of any of Examples 27 or 28, wherein the signal transmitted by the second UE comprises a demodulation reference signal transmitted within an SCI message.

Example 30: The method of wireless of communication of any one of Examples 27 to 29, wherein the signal transmitted by the first device comprises a demodulation reference signal transmitted within the first SCI message.

Example 31: The method of wireless of communication of any one of Examples 27 to 30, wherein the SIR threshold is about 10 decibels (dB).

Example 32: The method of wireless of communication of any one of Examples 27 to 31, wherein determining the SIR based on the comparison of the first RSRP to the second RSRP comprises: subtracting the second RSRP from the first RSRP.

Example 33: The method of wireless of communication of any one of Examples 27 to 32, wherein determining that the SIR of the first RSRP and the second RSRP associated is above the SIR threshold comprises: determining the first RSRP based on the signal transmitted by the second UE; determining an adaptive RSRP threshold based on the first RSRP and the SIR threshold; and determining that the second RSRP is below the adaptive RSRP threshold.

Example 34: The method of wireless of communication of any one of Examples 27 to 33, wherein determining an adaptive RSRP threshold based on the first RSRP and the SIR threshold comprises: subtracting the SIR threshold from the first RSRP.

Example 35: The method of wireless of communication of any one of Examples 27 to 34, further including: receiving a plurality of SCI messages from the second UE; determining a plurality of RSRP values using the respective plurality of SCI messages from the second UE; and determining an average RSRP value using the plurality of RSRP values, wherein the average RSRP value is used as the first RSRP associated with the signal transmitted by the second UE.

Example 36: The method of wireless of communication of any one of Examples 27 to 35, wherein receiving the plurality of SCI messages from one or more devices located proximate to the first UE comprises: monitoring each resource block in the sensing window for an SCI message.

Example 37: The method of wireless of communication of any one of Examples 27 to 36, further including: determining that a plurality of devices have reserved a first resource; determining an RSRP for each of the plurality of devices; generating an aggregate RSRP for the first resource using the RSRP associated with each of the plurality of devices; and determining, for the first resource, that an SIR of the aggregate RSRP and the second RSRP is above an SIR threshold; and determining that the first resource is available based on the SIR being above the SIR threshold.

Example 38: The method of wireless of communication of any one of Examples 27 to 37, wherein generating the aggregate RSRP for the first resource comprises: summing the RSRPs associated with the plurality of devices.

Example 39: The method of wireless of communication of any one of Examples 27 to 38, wherein the report indicative of which resources in the upcoming resource selection window are available for transmission by the second UE comprises a binary value associated with each of a plurality of resources corresponding to the resource selection window, a first binary value indicating that a particular resource of the plurality of resources is available, and the second binary value indicating that particular resources of the plurality of resources is unavailable.

Example 40: The method of wireless of communication of any one of Examples 27 to 39, further comprising: receiving, during a second sensing window prior to the sensing window, a prior SCI message from the first device; determining that an RSRP associated with the prior SCI message is below a threshold RSRP; determining that resources reserved by the prior SCI message is available based on the RSRP being below the RSRP threshold; generating a prior report indicative of which resources in the upcoming resource selection window are available for transmission by the second UE based on the RSRP associated with the first device that transmitted the plurality of SCI messages received during the sensing window; and transmitting the report to the second UE.

Example 41: The method of wireless of communication of any one of Examples 27 to 40, wherein the sensing window prior to the sensing window precedes the first UE receiving the request from the second UE for the report indicative of resources available in an upcoming resource selection window.

Example 42: The method of wireless of communication of any one of Examples 27 to 41, further including: determining, subsequent to the prior sensing window and prior to the sensing window, a channel utilization parameter; determining that channel utilization indicated by the channel utilization parameter exceeds a threshold channel utilization; selecting, based on the channel utilization indicated by the channel utilization parameter exceeding the threshold channel utilization, an adaptive resource utilization detection technique; and based on the selection of the adaptive resource utilization detection technique, determining the SIR of the first RSRP and the second RSRP.

Example 43: The method of wireless of communication of any one of Examples 27 to 42, wherein the channel utilization parameter is a Channel Busy Ratio (CBR) value, and wherein selecting the adaptive resource utilization detection technique comprises: selecting the adaptive resource utilization detection technique based on the CBR value exceeding a limit.

Example 44: The method of wireless of communication of any one of Examples 27 to 43, further including: determining a modulation and coding scheme (MCS) utilized by the second UE; and setting the SIR threshold based on the MCS utilized by the second UE.

Example 45: The method of wireless of communication of any one of Examples 27 to 44, further including: determining, for a second device associated with a second SCI message of the plurality of SCI messages, that an SIR of the first RSRP and a third RSRP associated with a signal transmitted by the second device is below an SIR threshold; determining that resources reserved by the second SCI message are unavailable based on the SIR being above the SIR threshold.

Example 46: The method of wireless of communication of any one of Examples 27 to 45, further including: receiving, from the second UE, information indicative of a priority associated with one or more packets to be transmitted by the second UE; determining the SIR threshold based on the priority associated with one or more packets to be transmitted by the second UE.

Example 47: The method of wireless of communication of any one of Examples 27 to 46, further including: receiving, from the second UE, information indicative of a priority associated with the first UE; determining the SIR threshold based on the priority associated with the first UE.

Example 48: The method of wireless of communication of any one of Examples 27 to 47, further including: receiving, from the second UE, information indicative of a priority associated with one or more packets to be transmitted by the second UE; receiving, from the second UE, information indicative of a priority associated with the first UE; and determining the SIR threshold based on the priority associated with one or more packets to be transmitted by the second UE, and the priority associated with the first UE.

Example 49: An apparatus for wireless communication, comprising: a processor; and a memory communicatively coupled to the at least one processor, wherein the processor and memory are configured to: perform a method of any of Examples 27 to 48.

Example 50: A non-transitory computer-readable medium storing computer-executable code, comprising code for causing a computer to cause a processor to: perform a method of any of Examples 27 to 48.

Example 51: An apparatus for wireless communication, comprising: comprising: at least one means for carrying out a method of any of Examples 27 to 48.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-10 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operable at a first user equipment (UE), the method comprising:
   transmitting, to a second UE, a resource report indicative of an availability of a set of resources in a sidelink resource pool, the resource report being based on a measurement of interference in the set of resources,
   wherein the resource report comprises resource availability information indicating that a reserved set of resources reserved for a third UE is available for use by the second UE, the resource availability information being based on an interference parameter associated with the second UE or the third UE.

2. The method of claim 1, further comprising:
   receiving a request from the second UE for the resource report,
   wherein transmitting the resource report comprises transmitting the resource report in response to the request.

3. The method of claim 1, wherein the resource report is transmitted after a predetermined period of time expires.

4. The method of claim 1, further comprising:
   identifying one or more collisions of transmissions from the second UE,
   wherein the resource report is transmitted in response to the identified one or more collisions.

5. The method of claim 4, wherein the one or more collisions include multiple consecutive collisions of transmissions by the second UE.

6. The method of claim 1, further comprising:
   receiving a control message from the third UE, the control message comprising resource reservation information identifying the reserved set of resources reserved for the third UE,
   wherein the measurement of interference corresponds to a measurement of a signal strength of the control message from the third UE.

7. The method of claim 6, further comprising:
   receiving a reference signal from the second UE,
   wherein the interference parameter corresponds to the reference signal from the second UE and the control message from the third UE,
   wherein the interference parameter comprises a signal-to-interference ratio (SIR), and
   wherein the resource availability information of the resource report further indicates that the reserved set of resources reserved for the third UE is available for use by the second UE in response to the SIR of the interference parameter being equal to or greater than an SIR threshold.

8. The method of claim 7, wherein the interference parameter is calculated based on a ratio between the signal strength of the control message from the third UE and a signal strength of the reference signal from the second UE.

9. The method of claim 6, wherein the resource availability information indicates that the reserved set of resources reserved for the third UE is available for use by the second UE in response to the signal strength of the control message from the third UE being equal to or less than the interference parameter.

10. The method of claim 9, further comprising:
receiving a reference signal from the second UE,
wherein the interference parameter is calculated based on a comparison between a signal strength of the reference signal from the second UE and a signal-to-interference ratio (SIR) threshold.

11. The method of claim 10, further comprising:
receiving, from the second UE, priority information indicative of a priority associated with one or more packets to be transmitted by the second UE; and
determining the SIR threshold based on the priority associated with the one or more packets.

12. The method of claim 10, further comprising:
receiving, from the second UE, data rate information indicative of a modulation and coding scheme (MCS) associated with one or more packets to be transmitted by the second UE; and
determining the SIR threshold based on the MCS associated with the one or more packets.

13. The method of claim 1, further comprising:
receiving a plurality of control messages from a plurality of UEs including the third UE, each of the plurality of control messages comprising resource reservation information identifying the reserved set of resources reserved for each of the plurality of UEs,
wherein the measurement of interference corresponds to an aggregate of measurements of signal strengths of the plurality of control messages from the plurality of UEs, and
wherein the resource available information indicates that the reserved set of resources reserved for the plurality of UEs is available for use by the second UE in response to the aggregate of measurements of signal strengths being equal to or less than the interference parameter.

14. A first user equipment (UE) for wireless communication, comprising:
one or more processors; and
a memory communicatively coupled to the one or more processors, wherein the one or more processors are configured to cause the first UE to:
transmit, to a second UE, a resource report indicative of an availability of a set of resources in a sidelink resource pool, the resource report being based on a measurement of interference in the set of resources,
wherein the resource report comprises resource availability information indicating that a reserved set of resources reserved for a third UE is available for use by the second UE, the resource availability information being based on an interference parameter associated with the second UE or the third UE.

15. The first UE of claim 14, wherein the one or more processors are further configured to cause the first UE to:
receive a request from the second UE for the resource report; and
transmit the resource report in response to the request.

16. The first UE of claim 14, wherein the one or more processors are further configured to cause the first UE to:
receive a control message from the third UE, the control message comprising resource reservation information identifying the reserved set of resources reserved for the third UE,
wherein the measurement of interference corresponds to a measurement of a signal strength of the control message from the third UE.

17. The first UE of claim 16, wherein the one or more processors are further configured to cause the first UE to:
receive a reference signal from the second UE,
wherein the interference parameter corresponds to the reference signal from the second UE and the control message from the third UE,
wherein the interference parameter comprises a signal-to-interference ratio (SIR), and
wherein the resource availability information of the resource report further indicates that the reserved set of resources reserved for the third UE is available for use by the second UE in response to the SIR of the interference parameter being equal to or greater than an SIR threshold.

18. The first UE of claim 17, wherein the interference parameter is calculated based on a ratio between the signal strength of the control message from the third UE and a signal strength of the reference signal from the second UE.

19. The first UE of claim 16, wherein the resource availability information indicates that the reserved set of resources reserved for the third UE is available for use by the second UE in response to the signal strength of the control message from the third UE being equal to or less than the interference parameter.

20. The first UE of claim 19, wherein the one or more processors are further configured to cause the first UE to:
receive a reference signal from the second UE,
wherein the interference parameter is calculated based on a comparison between a signal strength of the reference signal from the second UE and a signal-to-interference ratio (SIR) threshold.

21. A non-transitory computer-readable medium in a first UE storing computer-executable code, comprising code for causing a computer to:
transmit, to a second UE, a resource report indicative of an availability of a set of resources in a sidelink resource pool, the resource report being based on a measurement of interference in the set of resources,
wherein the resource report comprises resource availability information indicating that a reserved set of resources reserved for a third UE is available for use by the second UE, the resource availability information being based on an interference parameter associated with the second UE or the third UE.

22. The method of claim 1, wherein the resource availability information is based on a first interference parameter associated with the second UE and a second interference parameter associated with the third UE.

23. The first UE of claim 14, wherein the resource availability information is based on a first interference parameter associated with the second UE and a second interference parameter associated with the third UE.

24. The transitory computer-readable medium of claim 21, wherein the resource availability information is based on a first interference parameter associated with the second UE and a second interference parameter associated with the third UE.

* * * * *